(12) United States Patent
Park et al.

(10) Patent No.: US 12,066,592 B2
(45) Date of Patent: Aug. 20, 2024

(54) META-OPTICAL DEVICE AND ELECTRONIC APPARATUS INCLUDING THE SAME

(71) Applicant: SAMSUNG ELECTRONICS CO., LTD., Suwon-si (KR)

(72) Inventors: Hyunsung Park, Suwon-si (KR); Hyeonsoo Park, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 570 days.

(21) Appl. No.: 17/152,927

(22) Filed: Jan. 20, 2021

(65) Prior Publication Data

US 2021/0271000 A1    Sep. 2, 2021

Related U.S. Application Data

(60) Provisional application No. 62/982,892, filed on Feb. 28, 2020.

(30) Foreign Application Priority Data

Aug. 25, 2020    (KR) .................. 10-2020-0107402

(51) Int. Cl.
*G02B 1/00*    (2006.01)
*G01B 11/24*    (2006.01)
*G02B 5/18*    (2006.01)

(52) U.S. Cl.
CPC .............. *G02B 1/002* (2013.01); *G01B 11/24* (2013.01); *G02B 5/1809* (2013.01); *G02B 5/1871* (2013.01); *G02B 2207/101* (2013.01)

(58) Field of Classification Search
CPC .... G02B 1/002; G02B 5/1809; G02B 5/1871; G02B 2207/101; G02B 5/1876;
(Continued)

(56) References Cited

U.S. PATENT DOCUMENTS 5,847,877 A    12/1998   Imamura et al.
8,605,358 B2   12/2013   Ushigome
(Continued)

FOREIGN PATENT DOCUMENTS

CN    102844685 B    *   3/2016    ............. B82Y 20/00
CN    109799611 A        5/2019
(Continued)

OTHER PUBLICATIONS

Arbabi, A., et al., "Miniature optical planar camera based on a wide-angle metasurface doublet corrected for monochromatic aberrations", Nature Communications, Nov. 28, 2016, pp. 1-9.
(Continued)

*Primary Examiner* — Wyatt A Stoffa
*Assistant Examiner* — Ray Alexander Dean
(74) *Attorney, Agent, or Firm* — Sughrue Mion, PLLC

(57) ABSTRACT

Provided is a meta-optical device including a first layer including a plurality of first nanostructures and a first material disposed adjacent to the plurality of first nanostructures, a second layer disposed on the first layer, the second layer including a plurality of second nanostructures and a second material disposed adjacent to the plurality of second nanostructures, wherein the first layer and the second layer include regions in which signs of an effective refractive index change rate in a first direction are opposite to each other, and wherein the meta-optical device is configured to obtain a target phase delay profile with respect to incident light of a predetermined wavelength band.

38 Claims, 17 Drawing Sheets

(58) Field of Classification Search
CPC .. G02B 27/4272; G02B 5/189; G02B 5/1842; G02B 2005/1804; G01B 11/24; B82Y 20/00; B82Y 40/00; B82Y 30/00
See application file for complete search history.

(56) References Cited

U.S. PATENT DOCUMENTS

| | | | |
|---|---|---|---|
| 10,852,460 | B2 | 12/2020 | Iwata |
| 2003/0156325 | A1* | 8/2003 | Hoshi ................ G02B 5/1809 359/489.08 |
| 2012/0299670 | A1* | 11/2012 | Liu ...................... G02B 1/002 333/239 |
| 2014/0044392 | A1 | 2/2014 | Fattal et al. |
| 2015/0346477 | A1* | 12/2015 | Kyoung ................ H04N 23/56 359/385 |
| 2018/0081150 | A1* | 3/2018 | Nam .................... G02B 3/0081 |
| 2018/0224574 | A1* | 8/2018 | Lee ...................... G02B 1/002 |
| 2019/0154877 | A1 | 5/2019 | Capasso et al. |
| 2020/0052027 | A1 | 2/2020 | Arbabi et al. |
| 2020/0174163 | A1* | 6/2020 | Han .................... G02B 5/189 |
| 2020/0264343 | A1 | 8/2020 | Han et al. |

FOREIGN PATENT DOCUMENTS

| | | | |
|---|---|---|---|
| CN | 111158070 | A | 5/2020 |
| DE | 19533591 | A1 | 3/1996 |
| EP | 0902304 | A2 | 3/1999 |
| JP | 9127321 | A | 5/1997 |
| JP | 2013156404 | A | 8/2013 |
| JP | 5777353 | B2 | 9/2015 |
| JP | 201932518 | A | 2/2019 |
| KR | 20170112915 | A * | 10/2017 |
| KR | 1020200011436 | A1 | 2/2020 |
| WO | 9918458 | A1 | 4/1999 |
| WO | 2018220473 | A1 | 12/2018 |

OTHER PUBLICATIONS

Communication dated Jul. 15, 2021 issued by the European Patent Office in application No. 21155228.6.
Communication issued Nov. 18, 2021 by the European Patent Office in counterpart European Patent Application No. 21155228.6.
Shrestha, Sajan et al., "Broadband achromatic dielectric metalenses", Light: Science & Applications, vol. 7, No. 1, Nov. 7, 2018, XP055779266. (11 pages total).
Office Action dated Sep. 20, 2023, issued by European Patent Center in European Patent Application No. 21155228.6.

* cited by examiner

META-OPTICAL DEVICE AND ELECTRONIC APPARATUS INCLUDING THE SAME

CROSS-REFERENCE TO RELATED APPLICATIONS

This application claims the benefit of U.S. provisional application No. 62/982,892, filed on Feb. 28, 2020, in the U.S. Patent and Trademark Office and priority to Korean Patent Application No. 10-2020-0107402, filed on Aug. 25, 2020 in the Korean Intellectual Property Office, the disclosures of which are incorporated herein in their entireties by reference.

BACKGROUND

1. Field

Example embodiments of the present disclosure relate to a meta-optical device and an electronic apparatus including the same.

2. Description of Related Art

A planar diffraction device utilizing a meta-structure may exhibit various optical effects that the refractive device of the related art fails to implement, and may implement a thin optical system such that interest in the planar diffraction device is increasing in many fields.

The meta-structure has a nanostructure in which a numerical value less than the wavelength of incident light is applied to the shape, period, etc., and the nanostructure is designed to satisfy a phase delay profile set for each position with respect to light of the desired wavelength band to implement desired optical performance. When discontinuity appears in the phase delay profile, light diffraction occurs in an unintended direction, which reduces light efficiency.

SUMMARY

One or more example embodiments provide meta-optical devices that act on a broadband and exhibit high efficiency.

One or more example embodiments also provide electronic apparatuses utilizing a meta-optical device.

Additional aspects will be set forth in part in the description which follows and, in part, will be apparent from the description, or may be learned by practice of example embodiments of the disclosure.

According to an aspect of an example embodiment, there is provided a meta-optical device including a first layer including a plurality of first nanostructures and a first material disposed adjacent to the plurality of first nanostructures, a second layer disposed on the first layer, the second layer including a plurality of second nanostructures and a second material disposed adjacent to the plurality of second nanostructures, wherein the first layer and the second layer include regions in which signs of an effective refractive index change rate in a first direction are opposite to each other, and wherein the meta-optical device is configured to obtain a target phase delay profile with respect to incident light of a predetermined wavelength band.

A first ratio of a dispersion change rate to an effective refractive index change rate in the first direction of the first layer may be different from a second ratio of a dispersion change rate to an effective refractive index change rate in the first direction of the second layer.

The target phase delay profile may have a dispersion that is 0 with respect to a wavelength of the predetermined wavelength band.

A phase delay profile of the first layer and the target phase delay profile may have a same sign of a change rate in the first direction.

A second ratio of a dispersion change rate to an effective refractive index change rate of the second layer in the first direction may be greater than a first ratio of a dispersion change rate to an effective refractive index change rate of the first layer in the first direction.

A material included in the second layer may have a greater dispersion than a material included in the first layer.

A first phase delay profile of the first layer and a second phase delay profile of the second layer may have opposite signs of a change rate corresponding to a position change in the first direction.

The target phase delay profile may be a continuous function with respect to a position of the meta-optical device in the predetermined wavelength band.

The plurality of first nanostructures and the plurality of second nanostructures may have a pillar shape.

The plurality of first nanostructures and the plurality of second nanostructures may have a ratio of height to width greater than 2.

A first height of the plurality of first nanostructures and a second height of the plurality of second nanostructures may be greater than a center wavelength of the predetermined wavelength band.

The plurality of first nanostructures may have a higher refractive index than the first material, the plurality of second nanostructures may have a higher refractive index than the second material, and a pattern of change in widths of the plurality of first nanostructures and a pattern of change in widths of the plurality of second nanostructures may be opposite to each other along a direction away from a center of the meta-optical device.

The plurality of first nanostructures may have a lower refractive index than the first material, the plurality of second nanostructures may have a higher refractive index than the second material, and a pattern of change in widths of the plurality of first nanostructures and a pattern of change in widths of the plurality of second nanostructures may be same along the direction away from a center of the meta-optical device.

The plurality of first nanostructures may have an inner pillar and a shell pillar adjacent to the inner pillar.

A refractive index of the inner pillar may be lower than a refractive index of the shell pillar.

The refractive index of the shell pillar may be higher than a refractive index of the first material.

The plurality of second nanostructures may have a higher refractive index than the second material.

A pattern of change in widths of the plurality of first nanostructures and a pattern of change in widths of the plurality of second nanostructures may be opposite to each other along the direction away from a center of the meta-optical device.

The plurality of second nanostructures may have a lower refractive index than the second material.

A pattern of change in widths of the plurality of first nanostructures and a pattern of change in widths of the plurality of second nanostructures may be same as each other along the direction away from a center of the meta-optical device.

The plurality of first nanostructures may be a plurality of holes.

The plurality of second nanostructures may have a higher refractive index than the second material.

A pattern of change in widths of the holes of the plurality of first nanostructures and a pattern of change in widths of a plurality of holes of the plurality of second nanostructures may be same as each other along the direction away from a center of the meta-optical device.

The plurality of second nanostructures may have a lower refractive index than the second material.

A pattern of change in widths of the plurality of holes of the plurality of first nanostructures and a pattern of change in widths of a plurality of holes of the plurality of second nanostructures may be opposite to each other along the direction away from a center of the meta-optical device.

The meta-optical device may further include a support layer configured to support the first layer and the second layer.

The meta-optical device may further include a spacer layer between the first layer and the second layer.

The target phase delay profile may have a dispersion less than 0 with respect to a wavelength of light in the predetermined wavelength band.

The target phase delay profile may have a dispersion greater than 0 with respect to a wavelength of light in the predetermined wavelength band.

The meta-optical device may be a lens.

The meta-optical device may be a beam deflector.

The meta-optical device may be a beam shaper.

The predetermined wavelength band may be in a range of 400 nm to 700 m.

A ratio of a length of a region in the first direction to a total length of the meta-optical device in the first direction may be greater than or equal to 80%.

A diffraction efficiency of the meta-optical device may be greater than or equal to 0.8 with respect to light in the predetermined wavelength band.

According to another aspect of an example embodiment, there is provided an electronic apparatus including an imaging lens assembly including at least one refractive lens and a meta-optical device, the meta optical device including a first layer including a plurality of first nanostructures and a first material disposed adjacent to the plurality of first nanostructures, a second layer disposed on the first layer, the second layer including a plurality of second nanostructures and a second material disposed adjacent to the plurality of second nanostructures, wherein the first layer and the second layer include regions in which signs of an effective refractive index change rate in a first direction are opposite to each other, and wherein the meta-optical device is configured to obtain a target phase delay profile with respect to incident light of a predetermined wavelength band, and an image sensor configured to convert an optical image formed by the imaging lens into an electrical signal.

According to another aspect of an example embodiment, there is provided an electronic apparatus including a light source, a meta-optical device configured to modulate light from the light source and transfer the light to an object, the meta-optical device including a first layer including a plurality of first nanostructures and a first material disposed adjacent to the plurality of first nanostructures, a second layer disposed on the first layer, the second layer including a plurality of second nanostructures and a second material disposed adjacent to the plurality of second nanostructures, wherein the first layer and the second layer include regions in which signs of an effective refractive index change rate in a first direction are opposite to each other, and wherein the meta-optical device is configured to obtain a target phase delay profile with respect to incident light of a predetermined wavelength band, and a light detector configured to sense light reflected from the object that is irradiated with the modulated light from the meta-optical device.

According to another aspect of an example embodiment, there is provided a meta-optical device including a first layer including a plurality of first nanostructures and a first material disposed adjacent to the plurality of first nanostructures, a second layer disposed on the first layer, the second layer including a plurality of second nanostructures and a second material disposed adjacent to the plurality of second nanostructures, wherein the first layer and the second layer include regions in which signs of an effective refractive index change rate in a first direction are opposite to each other, and wherein a pattern of change in widths of the plurality of first nanostructures and a pattern of change in widths of the plurality of second nanostructures are equal to or opposite from each other in a direction away from a center of the meta-optical device.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
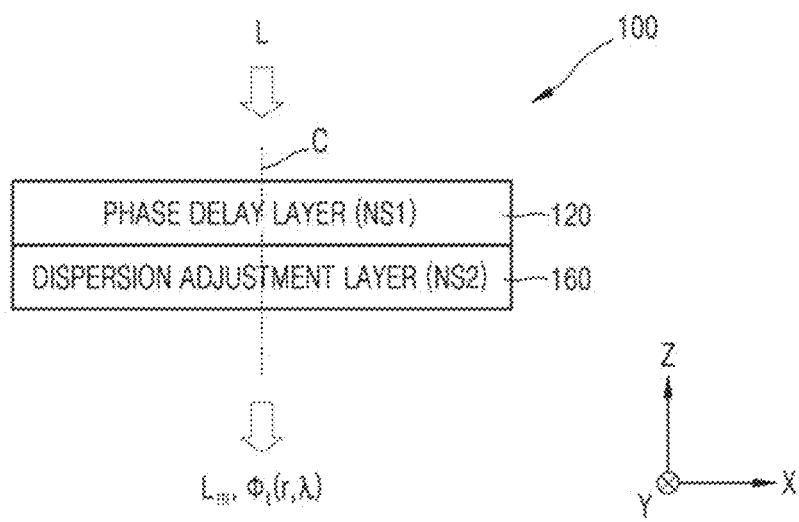
FIG. 1 is a conceptual diagram illustrating a schematic structure and function of a meta-optical device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. Example embodiments described are merely exemplary, and various modifications are possible from these example embodiments. In the drawings below, the size of each component in the drawings may be exaggerated for clarity and convenience of description.

Hereinafter, what is described as "upper" or "on" may include not only being directly over and in contact but also being over and not in contact.

Terms such as "first" and "second" may be used to describe various components, but are used only for the purpose of distinguishing one component from other components. These terms do not limit the difference in materials or structures of the components.

The terms of a singular form may include plural forms unless otherwise specified. Also, when a part "includes" a component, this means that, unless specifically stated otherwise, it may further include other components rather than excluding other components.

In addition, the terms "part", "module", and the like, which are described in the specification, mean a unit for processing at least one function or operation, and the unit may be implemented in hardware or software, or in a combination of hardware and software.

The use of the term "above" and similar indication terms may correspond to both singular and plural.

The steps that make up a method may be done in a suitable order, unless there is a clear statement that they should be done in the order described. In addition, the use of all exemplary terms (e.g., and the like) is merely for describing the technical idea in detail, and the scope of rights is not limited by these terms unless it is limited by the claims.

Figure 2:
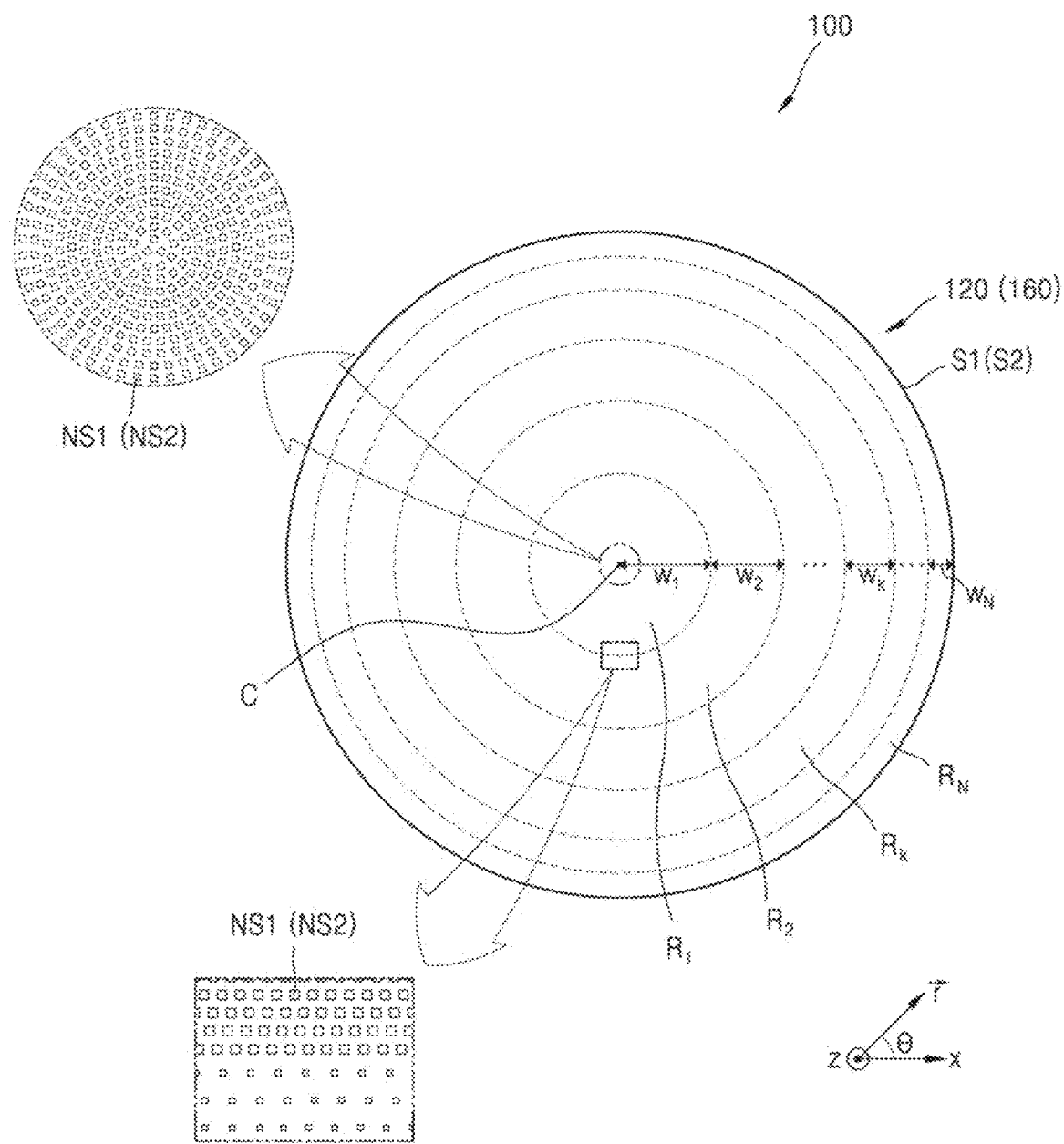
FIG. 2 is a plan view illustrating a schematic configuration of a plurality of layers constituting a meta-optical device according to an example embodiment.

FIG. 1 is a conceptual diagram illustrating a schematic structure and function of a meta-optical device 100 according to an example embodiment. FIG. 2 is a plan view illustrating a schematic configuration of a plurality of layers constituting the meta-optical device 100 according to an example embodiment.

The meta-optical device 100 is a diffractive device including a nanostructure having a shape dimension of a sub-wavelength, and its detailed structure is set to exhibit a predetermined target phase delay profile with respect to incident light L of a predetermined wavelength band. Here, the sub-wavelength refers to a shape dimension smaller than a center wavelength $\lambda_0$ of the predetermined wavelength band.

The incident light L passes through the meta-optical device 100 and is emitted as modulated light Lm having a phase that is modulated for each position corresponding to the meta-optical device 100. When light is incident to the meta-optical device 100 and passes through the meta-optical device 100, the light encounters a refractive index distribution by an arrangement of a plurality of nanostructures NS1 and NS2 of different refractive indices than those of surrounding materials. The shapes of a wavefront connecting points having the same phase in the traveling path of light are different before and after undergoing the refractive index distribution by the arrangement of the first nanostructure NS1 and the second nanostructure NS2, which is expressed as a phase delay. The degree of the phase delay differs according to each position that is a variable of the refractive index distribution. The degree of the phase delay varies depending on x and y coordinates on a plane perpendicular to the traveling direction (Z direction) of light at a position immediately after the incident light L incident in the Z direction passes through the meta-optical device 100. As described above, the phase of light after passing through the meta-optical device 100 represents a phase different from the phase at the time of incidence. A target phase delay profile $\varphi_t$ represented by the modulated light $L_m$ represents a phase relative to the phase of the incident light L. The target phase delay profile φt represents a phase delay according to each position after passing through the meta-optical device 100, while this phase delay also depends on the wavelength λ of the incident light L. The target phase delay profile Pt is thus expressed as a function $\varphi_t(r, \lambda)$ of a position and a wavelength.

The optical performance of the meta-optical device 100, for example, a function as a lens, a mirror, a beam deflector, or a beam shaper, is determined according to the target phase delay profile $\varphi_t$.

The meta-optical device 100 includes a first layer 120 and a second layer 160. The first layer 120 has a structure based on a first nanostructure NS1 and is configured to operate as a phase delay layer. The second layer 160 has a structure based on a second nanostructure NS2 and is configured to operate as a dispersion adjustment layer.

The first layer 120 configured to operate as the phase delay layer and the second layer 160 configured to operate as the dispersion adjustment layer may have opposite signs of an effective refractive index change rate according to their positions. For example, when the material and shape of the first nanostructure NS1 are set such that the effective refractive index of the first layer 120 gradually increases in a predetermined first direction, the material and shape of the second nanostructure NS2 may be set such that the effective refractive index of the second layer 160 gradually decreases in the first direction.

This multi-layered structure implements the target phase delay profile Pt desired by the meta-optical device 100, but minimizes a phase discontinuity according to the position of the target phase delay profile φt, thereby increasing optical efficiency.

In general optical materials, the dispersion has a negative value in a visible wavelength band, and also, as the refractive index increases, the size of the dispersion tends to increase. Therefore, it is difficult to pattern one type of material to implement a phase delay profile without discontinuity. For example, the phase delay profile of the first layer 120 and the phase delay profile of the second layer 160 may have discontinuity. The phase discontinuity may mainly appear at the boundary of a plurality of regions (2π zone) $R_1, \ldots, R_k, \ldots, R_N$ illustrated in FIG. 2. However, the meta-optical device 100 of an example embodiment may subdivide functions of the first layer 120 and the second layer 160 from the viewpoint of adjusting a change in the refractive index and the dispersion, and derive a structure optimized for each position of a unit component UE in which various types of materials and shapes are combined to have a phase delay profile with almost no discontinuity in a configuration in which the first layer 120 is combined with the second layer 160.

The meta-optical device 100 according to the example embodiment includes a layer indicating a phase delay profile having the same tendency that is a pattern as the target phase delay profile $\varphi_t$, and a layer indicating the opposite phase delay profile. For example, the first layer 120 and the second layer 160 may exhibit different phase delay profiles. The shape and the arrangement of the first nanostructure NS1 may be set such that the first layer 120 configured to operate as the phase delay layer exhibits the phase delay profile having the same pattern as the target phase delay profile qt. The shape and the arrangement of the second nanostructure NS2 may be set such that the second layer 160 configured to operate as the dispersion adjustment layer exhibits a phase delay profile having a pattern different from that of the target phase retardation profile Pt and has a main function of adjusting the dispersion of the refractive index according to the wavelength.

Here, the phase delay profile of the first layer 120 may be a phase distribution relative to a phase when the light is incident on the first nanostructures NS1 of the first layer 120 at a position immediately after the light passes through the first nanostructures NS1. In addition, the phase delay profile of the second layer 160 may be a phase distribution relative to a phase when the light is incident on the second nanostructures NS2 of the second layer 160 at a position immediately after the light passes through the second nanostructures NS2.

The positions of the first layer 120 and the second layer 160 may be switched with each other. In FIG. 1, the incident light L passes through the first layer 120 first and then is incident on the second layer 160, but embodiments are not limited thereto. The order of the first layer 120 and the second layer 160 may be reversed in relation to the incident light L. In addition, it will be described for convenience that the first layer 120 operates as the phase delay layer and the second layer 160 operates as the dispersion adjustment layer. However, embodiments are not limited thereto, and the first layer 120 may operate as a dispersion adjustment layer and the second layer may operate as a phase delay layer.

The shapes of the first nanostructure NS1 and the second nanostructure NS2 provided in each layer may be determined by a function of the position of each of the plurality of first nanostructures NS1 and second nanostructure NS2. For example, the first nanostructure NS1 provided in the first layer 120 may be determined by a function of coordinates (x,y) on a surface S1 on which the first nanostructure NS1 is placed. The coordinates (x,y) may be determined by a function of the distance from a point where the plane S1 meets a central axis C of the meta-optical device 100 and an angle θ between the radius vector of the corresponding position and the x-axis. The second nanostructure NS2 provided in the second layer 160 may be determined by a function of coordinates (x,y) on a surface S2 on which the second nanostructure NS2 is placed. The coordinates (x,y) may be determined by a function of the distance from a point where the plane S2 meets the central axis C of the meta-optical device 100 and the angle θ between the radius vector of the corresponding position and the x-axis. The first nanostructure NS1 provided in the first layer 120 and the second nanostructure NS2 provided in the second layer 160 each may be determined by a polar symmetric function depending only on the distance from the center thereof.

In an example embodiment, the shapes and arrangement of the first nanostructures NS1 and the second nanostructures NS2 may be set such that the above-described effective refractive index change and phase delay profile may be implemented in a radial direction away from the center defined on the surfaces S1 and S2 on which the first nanostructures NS1 and the second nanostructures NS2 are respectively placed.

The shapes of the first nanostructure NS1 and the second nanostructure NS2 may follow a predetermined rule, and the first layer 120 and the second layer 160 constituting the meta-optical device 100 may be divided according to the rule. The regions of the first layer 120 and the second layer 160 may be divided into a circle in the center portion and annular regions $R_1, R_2, \ldots, R_N$ surrounding the center, as shown in FIG. 2. In each layer, the first and second nanostructures NS1 and NS2 within the same region may be arranged by the same rule.

The regions $R_1, \ldots, R_k, \ldots, R_N$ are regions exhibiting a predetermined range of phase delay, and phase modulation ranges of the second region $R_2$ to the Nth region $R_N$ may be the same. The phase modulation range may be 2π radians. The phase modulation range of the first region $R_1$ may be equal to or less than 2π radians, but the first region $R_1$ to the Nth region $R_N$ may be referred to as 2π zones.

The function of each region, the number N of regions or width $W_1, \ldots, W_k, \ldots, W_N$ may be major variables of the performance of the meta-optical device 100.

In order for the meta-optical device 100 to function as a lens, a rule within a region is set such that the width of each region is not constant, and the direction of diffracting incident light in each region is slightly different. The number N of regions is related to the magnitude (absolute value) of the refractive power, and the sign of the refractive power may be determined according to the rule within each region. For example, positive refractive power may be implemented by an arrangement of a rule in which the size of the first and second nanostructures NS1 and NS2 decreases in the radial direction in each region, and negative refractive power may be implemented by an arrangement of a rule in which the size of the first and second nanostructures NS1 and NS2 increases.

In order for the meta-optical device 100 to function as a beam deflector, the rule within the region may be set such that the widths $W_1, \ldots W_k, \ldots W_N$ of the regions $R_1, \ldots, R_K, \ldots R_N$ are constant, and the incident light L diffracts in the regions $R_1, \ldots R_K, \ldots, R_N$ respectively in a predetermined constant direction.

In addition to the lens or the beam deflector, the meta-optical device 100 may function as a beam shaper having an arbitrary distribution for each position. In order for the above-described functions to be effectively performed within a desired wavelength band through the meta-optical device 100, a discontinuity according to the position should be reduced or prevented as much as possible in the target phase delay profile related to the function. When the target phase delay profile φt has the phase discontinuity, a part of the light passing through the meta-optical device 100 diffracts in a direction other than a desired diffraction direction, which deteriorates diffraction efficiency. The diffraction efficiency may be expressed as an energy ratio of light diffracted in an intended direction among the light transmitted through the meta-optical device 100. The shapes, arrangement, and materials of the first nanostructure NS1 and the second nanostructure NS2 of the first layer 120 and the second layer 160 may be set such that the meta-optical device 100 of an example embodiment has a diffraction efficiency of 0.8 or more in the desired wavelength band, for example, a diffraction efficiency of 0.8 or more in the broadband of 400 nm to 700 nm.

The first nanostructure NS1 and the second nanostructure NS2 may include a material having a difference in the refractive index from the surrounding material. For example, the material may have a high refractive index having a difference of 0.5 or more or a low refractive index having a difference of 0.5 or less from a refractive index of the surrounding material. One of the first nanostructure NS1 and the second nanostructure NS2 may have a refractive index higher than that of the surrounding material, and the other may have a refractive index lower than a refractive index of the surrounding material.

When the first nanostructure NS1 or the second nanostructure NS2 includes a material having a refractive index higher than a refractive index of the surrounding material, the first nanostructure NS1 or the second nanostructure NS2 may include at least one of c-Si, p-Si, a-Si III-V compound semiconductor (gallium arsenide (GaAs), gallium phosphide (GaP), gallium nitride (GaN), etc.), silicon carbide (SiC), titanium oxdie ($TiO_2$), silicon nitride (SiN), or a combination thereof, and the surrounding material of the low refractive index may include a polymer material of SU-8, PMMA, etc., silicon oxide ($SiO_2$), or SOG.

When the first nanostructure NS1 or the second nanostructure NS2 includes a material having a refractive index lower than that of the surrounding material, the first nanostructure NS1 or the second nanostructure NS2 may include $SiO_2$ or air, and the surrounding material of the high refractive index may include at least one of c-Si, p-Si, a-Si III-V compound semiconductor (GaAs, GaP, GaN, etc.), SiC, $TiO_2$, SiN, or a combination thereof.

Figure 3:
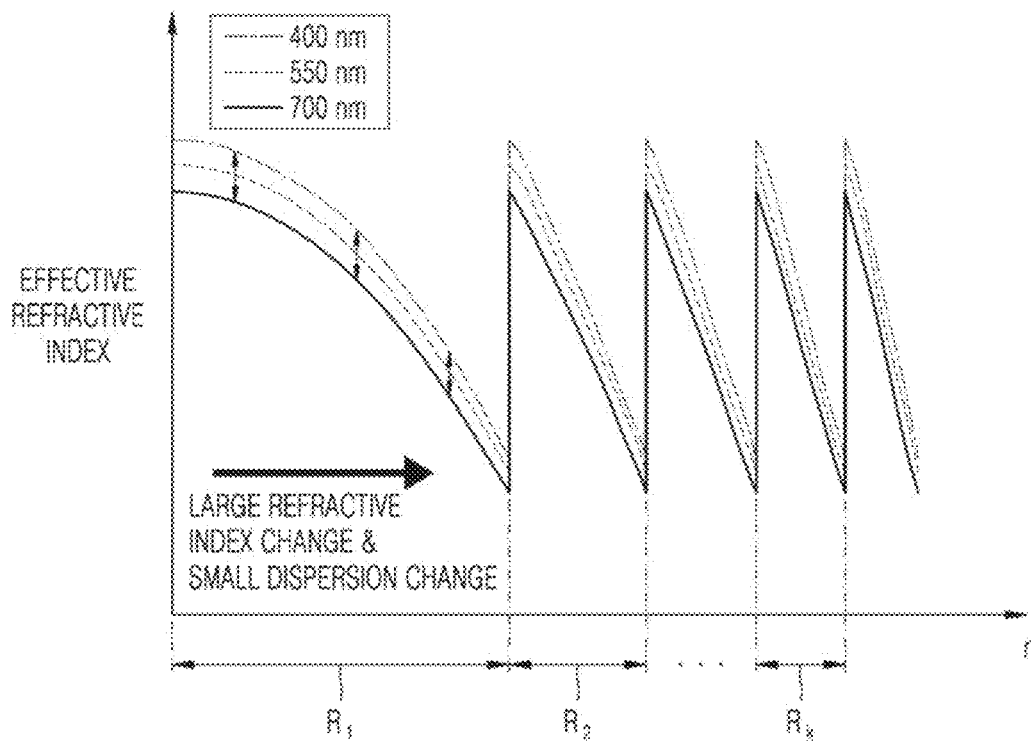
FIG. 3 is a graph illustrating the effective refractive index and dispersion of a phase delay layer provided in the meta-optical device of FIG. 1 for each wavelength and position.
Figure 4:
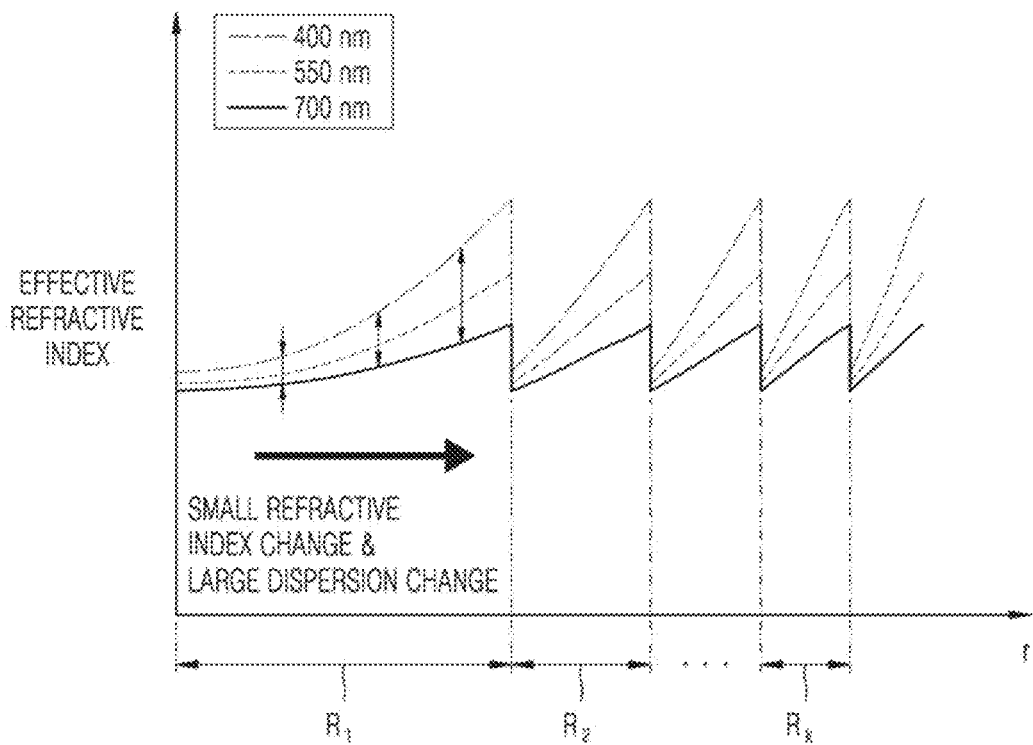
FIG. 4 is a graph illustrating the effective refractive index and dispersion of a dispersion adjustment layer provided in the meta-optical device of FIG. 1 for each wavelength and position.

FIG. 3 is a graph illustrating the effective refractive index and dispersion of a phase delay layer provided in the meta-optical device 100 of FIG. 1 for each wavelength and position, and FIG. 4 is a graph illustrating the effective refractive index and dispersion of a dispersion adjustment layer provided in the meta-optical device 100 of FIG. 1 for each wavelength and position.

The effective refractive index is a concept that assumes that the unit component UE of the meta-optical device 100 may be viewed as a uniform medium. When media having different refractive indices are included in the unit component UE, the concept of the effective refractive index may imply distribution of different media.

A dispersion of the refractive index may be a degree ∂n/∂x to which the refractive index differs depending on the wavelength, and may be dispersion of the effective refractive index in a structure including media having different refractive indices. Hereinafter, the dispersion of the refractive index may be referred to as dispersion.

Referring to FIGS. 3 and 4 together, the phase delay layer and the dispersion adjustment layer have opposite pattern of the effective refractive index change in a predetermined first direction. In the graph, the pattern of the effective refractive index change is in a radial direction r. The phase delay layer may exhibit an effective refractive index change of the same pattern as the target phase delay profile according to a position.

According to the pattern of the effective refractive index change, the phase delay profile indicated by the phase delay layer and a target phase delay profile have the same sign of the rate of change according to the position, and the phase delay profile indicated by the dispersion adjustment layer and the target phase delay profile have opposite signs of the rate of change according to the position. For example, the phase delay profile indicated by the phase delay layer and the phase delay profile indicated by the dispersion adjustment layer may have opposite signs of the rate of change according to the position.

The phase delay layer and the dispersion adjustment layer may have different dispersion change rates alar ∂n/∂λ according to the position to an effective refractive index change ∂n/∂r according to the position.

In the case of the phase delay layer, as shown in the graph of FIG. 3, the variation of the effective refractive index according to the position is larger than the variation of the effective refractive index of the dispersion adjustment layer according to the position, as shown in FIG. 4. To the contrary, dispersion, that is, a degree to which the effective refractive index differs according to the wavelength, is less in the phase delay layer than in the dispersion adjustment layer. Accordingly, the ratio of the dispersion change rate to the effective refractive index change according to the position has a larger value in the case of the dispersion adjustment layer than in the case of the phase delay layer. To this end, a material included in the dispersion adjustment layer may have a greater dispersion than a material included in the phase delay layer. As a material having high dispersion, for example, silicon (Si) or $TiO_2$, may be used, and as a material having low dispersion, for example, $SiO_2$ or silicon nitride ($Si_3N_4$), may be used. However, embodiments are not limited thereto. The ratio of the dispersion change rate to the effective refractive index change according to the position has a close relationship with the dispersion of the medium, the refractive index, and the shape distribution. For example, when the refractive index of a material constituting a nanostructure is less than the refractive index of a material surrounding the nanostructure, the dispersion change rate according to the position is less than when the refractive index of the material of the nanostructure is greater than the refractive index of the material surrounding the nanostructure. Accordingly, the ratio of the dispersion change rate to the effective refractive index change according to the position may be adjusted by a combination of a material and a shape different from the above example.

The specific details of the graphs of FIGS. 3 and 4 are examples in which the pattern of the effective refractive index change according to the position and the ratio of the dispersion change rate to the effective refractive index change differ from each other in the two layers, but are not limited thereto. In addition, although it is shown that the above-described constant pattern appears in all positions of each of the regions $R_1, R_2, \ldots, R_k$, this indicates an overall pattern that appears in most of the regions. For example, in some positions, the first layer and the second layer may have the same pattern of the effective refractive index change because a determined height or width is not implemented at a determined position due to an error in the nanostructure process. A boundary region accompanied by a rapid change in the effective refractive index, that is, a boundary region in which the regions $R_1, R_2, \ldots, R_k$, which are $2\pi$ zones, are adjacent to each other may exhibit a pattern of the effective refractive index change different from the intended pattern. In an example embodiment, a region in which the two layers have the opposite pattern of the effective refractive index change may be at least 50% or more or 80% or more of the entire region. Here, the ratio is based on a length in the predetermined first direction (e.g., the radial direction) indicating the change in the effective refractive index. The ratio is a ratio of the length of the first direction in which the two layers have opposite tendencies of the effective refractive index change with respect to the total length in the first direction indicating the change in the effective refractive index.

Figure 5:
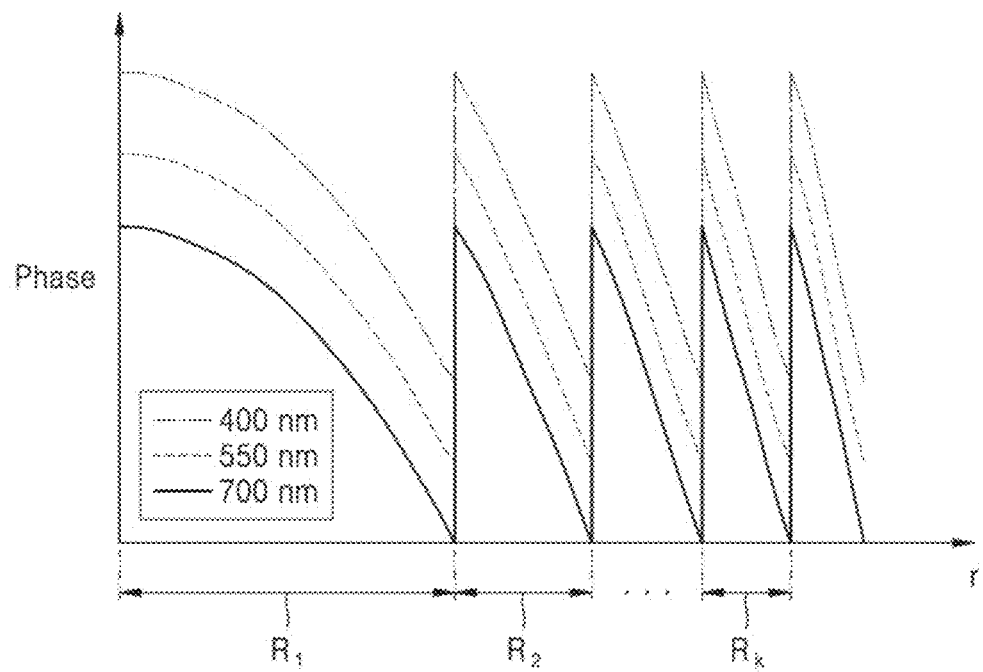
FIG. 5 is a graph illustrating a phase delay profile for each wavelength by the meta optical device of FIG. 1.

FIG. 5 is a graph illustrating phase delay profiles for each wavelength by the meta optical device 100 of FIG. 1.

The meta-optical device 100 in which two layers exhibiting properties such as those of the graphs of FIGS. 3 and 4 are combined may exhibit the phase delay profile without discontinuity according to a position.

Meanwhile, in the graph of FIG. 5, the phase delay profiles with respect to three wavelengths are merely shifted by a constant value and have the same form, which corresponds to a case where a dispersion is zero. However, this is exemplary, and a phase delay profile having a dispersion greater than 0 or less than 0 may be implemented according to detailed dispersion distributions in a phase delay layer and a dispersion adjustment layer.

Hereinafter, example embodiments to implement the phase delay profile with a small phase discontinuity according to the position regardless of a wavelength will be described.

In order to implement the phase delay profile with the small discontinuity with respect to light of a predetermined wavelength band, unit components UEs having different magnitudes of phase delays and amounts of dispersion may be used in the meta-optical device 100.

The phase delay of light passing through the unit component UE of the meta-optical device 100 may be expressed by linear approximation as shown in Equation (1).

$$\varphi(\omega, A, B) = A \times (\omega - \omega_0) + B + \varphi_{ref}(\omega) \quad \text{Equation (1)}$$

Here, $\omega$ is $2\pi/\lambda$, $\omega_0$ is $2\pi/\lambda_0$, $\lambda$ is a wavelength, $\lambda_0$ is a center wavelength of the predetermined wavelength band, A is a magnitude of the phase delay dispersion $\partial\varphi/\partial\lambda$, B is a magnitude of $\varphi|\lambda=\lambda_0$ of the phase delay at the center wavelength, and $\varphi_{ref}$ is a reference phase profile.

In order to make the phase delay profile continuous according to the position of the meta-optical device 100, a set of unit components UEs having values of A and B in the following ranges as shown in Equation (2) and Equation (3) is required. The unit component UE may be an optical structure having a shape dimension smaller than a sub-wavelength, that is, the center wavelength.

$$A_0 \leq A < A_1 \quad \text{Equation (2)}$$

$$B_0 \leq B < B_1 \quad \text{Equation (3)}$$

The required range of A varies depending on the chromatic aberration of the meta-optical device 100, and when the meta-optical device 100 is a lens, the required range of A widens as the lens diameter and the numerical aperture increase. When the phase delay profile according to the position in the operating wavelength range is the same, A=0. B1−B0 that is the required range of B needs to be greater than $2\pi$.

Assuming that the unit component UE of the meta-optical device 100 is a uniform medium capable of expressing the effective refractive index, the phase delay of light passing through the unit component UE may be expressed as shown in Equation (4).

$$\varphi(\omega, A, B) = n(\omega, A, B)\frac{\omega}{c_0}h. \quad \text{Equation (4)}$$

Here, n is the effective refractive index and h is the height of the unit component UE.

When Equation (4) is substituted into Equation (1), and the reference phase profile is set to increase linearly according to the frequency to simplify the equation ($\varphi_{ref}(\omega) = \alpha\omega$), the effective refractive index of the unit components UEs required to implement a phase delay profile with a small discontinuity may be expressed as shown in Equation (5) and Equation (6).

$$n(\omega, A, B) = \frac{c_0}{h}\left\{(A + \alpha) + \omega^{-1}(B - A\omega_0)\right\} \quad \text{Equation (5)}$$

or $$n(\lambda, A, B) = \frac{c_0}{h}\left\{(A + \alpha) + \frac{\lambda}{2\pi c_0}\left(B - A\frac{2\pi c_0}{\lambda_0}\right)\right\} \quad \text{Equation (6)}$$

As shown in Equations (5) and (6), effective refractive indices having various sizes and dispersions may be implemented through unit components UEs in order to implement the phase delay profile with the small discontinuity.

For example, in the simplest case, under the condition that A=0, as the phase delay at the center wavelength increases, unit components UEs having a positive value of the change in the effective refractive index dispersion are required. This condition is expressed at the center wavelength as an equation as shown in Equation (7a) and Equation (7b).

$$\frac{\partial n}{\partial B} = \frac{\lambda_0}{2\pi h} \quad \text{Equation (7a)}$$

$$\frac{\partial}{\partial B}\left(\frac{\partial n}{\partial \lambda}\right) = \frac{1}{2\pi h} \quad \text{Equation (7b)}$$

Here, n is the effective refractive index at the center wavelength $\lambda_0$.

As the effective refractive index at the center wavelength increases, the change in the magnitude of dispersion of the effective refractive index may need to have a positive value.

However, most of optical materials existing in nature have a negative value of dispersion at the optical frequency, and the larger the refractive index, the larger the magnitude of the dispersion. Thus, it is difficult to satisfy Equations 7(a) and 7(b) with the method of patterning of one kind of material according to the related art.

As the effective refractive index of the non-resonant unit element generally has the following characteristics as shown in Equation (8), it is difficult to satisfy Equations (7a) and (7b).

$$\frac{\partial n}{\partial B} > 0 \text{ then } \frac{\partial}{\partial B}\left(\frac{\partial n}{\partial \lambda}\right) < 0 \quad \text{Equation (8)}$$

For example, in the case of changing the phase delay at the center wavelength with the width of a nanopillar, which is used in a related method, increasing the width of the nanopillar increases the effective refractive index, but the magnitude of the negative refractive index dispersion also increases due to focusing of the electric field in a waveguide mode, that is, a dispersion change opposite to Equations (7a) and (7b) is obtained.

In the above description, the simplest condition that A=0 is an example, and when A is not 0, it is more difficult to implement a high-efficiency meta-optical device in a wide wavelength range based on related art because unit components UE having a combination of a more diverse refractive index dispersion and magnitude of the refractive index are required.

The meta-optical device 100 according to an example embodiment is proposed to have a structure capable of more precisely adjusting dispersion by using the unit component UE that is divided into a plurality of layers having different properties according to the position of the effective refractive index and wavelength.

Similar to Equation (6), a relation equation between the effective refractive index of the unit component UE divided into the plurality of layers and the condition for a continuous phase profile may be expressed as shown in Equation (9).

$$n(\lambda, A, B)h = \sum n_i(\lambda, A, B)h_i = c_0\left\{(A+\alpha) + \frac{\lambda}{2\pi c_0}\left(B - A\frac{2\pi c_0}{\lambda_0}\right)\right\}. \quad \text{Equation (9)}$$

Here, $n_i$ is an effective refractive index of an i-th layer, and $h_i$ is a height of the unit component UE of the i-th layer.

Similar to Equations (7a) and (7b), in the simplest condition that A=0, the condition capable of having the phase delay profile without discontinuity is expressed at the center wavelength as shown in Equation (10b) and Equation (10b).

$$\sum \frac{\partial n_i(\lambda_0, B)}{\partial B}h_i = \frac{\lambda_0}{2\pi} \quad \text{Equation (10a)}$$

$$\sum \frac{\partial}{\partial B}\left(\frac{\partial n_i(\lambda_0, B)}{\partial \lambda}\right)h_i = \frac{1}{2\pi} \quad \text{Equation (10b)}$$

Assuming that the effective refractive index of each layer constituting the meta-optical device 100 satisfies Equation (8), in order to satisfy Equations (10a) and (10b), at least one layer must have a negative change in the effective refractive index according to the change in a magnitude B of the phase delay at the center wavelength as shown in Equation (11).

$$\frac{\partial n_j}{\partial B}\right\} < 0 \text{ then } \frac{\partial}{\partial B}\left(\frac{\partial n_j}{\partial \lambda}\right) > 0 \quad \text{Equation (11)}$$

Here, $n_j$ is an effective refractive index at the center wavelength of a j-th layer. Considering the characteristic of the natural material that when the refractive index is high then the dispersion is high, a change in the effective refractive index dispersion of the j-th layer with respect to B has a positive value material of which dispersion increases.

Because the change in the effective refractive index dispersion of the j layer with respect to B has the positive value rather than a negative value, Equations (10a) and (10b) may be satisfied according to specific conditions.

For example, when the meta-optical device 100 includes two layers, heights h1 and h2 of each layer are as shown in Equation (12a) and Equation (12b).

$$h_1 = \frac{\lambda_0 \frac{\partial}{\partial B}\left(\frac{\partial n_2}{\partial \lambda}\right) - \frac{\partial n_2}{\partial B}}{2\pi\left[\left(\frac{\partial n_1}{\partial B}\right)\left\{\frac{\partial}{\partial B}\left(\frac{\partial n_2}{\partial \lambda}\right)\right\} - \left(\frac{\partial n_2}{\partial B}\right)\left\{\frac{\partial}{\partial B}\left(\frac{\partial n_1}{\partial \lambda}\right)\right\}\right]} \quad \text{Equation (12a)}$$

$$h_2 = \frac{-\lambda_0 \frac{\partial}{\partial B}\left(\frac{\partial n_1}{\partial \lambda}\right) + \frac{\partial n_1}{\partial B}}{2\pi\left[\left(\frac{\partial n_1}{\partial B}\right)\left\{\frac{\partial}{\partial B}\left(\frac{\partial n_2}{\partial \lambda}\right)\right\} - \left(\frac{\partial n_2}{\partial B}\right)\left\{\frac{\partial}{\partial B}\left(\frac{\partial n_1}{\partial \lambda}\right)\right\}\right]} \quad \text{Equation (12b)}$$

Here, in order for the heights h1 and h2 to have positive values, the following conditions in Equation (13a), Equation (13b), and Equation (13c) need to be satisfied.

$$\frac{\left(\frac{\partial n_i}{\partial B}\right)\left\{\frac{\partial}{\partial B}\left(\frac{\partial n_i}{\partial \lambda}\right)\right\}}{\left(\frac{\partial n_j}{\partial B}\right)\left\{\frac{\partial}{\partial B}\left(\frac{\partial n_j}{\partial \lambda}\right)\right\}} > 1 \quad \text{Equation (13a)}$$

$$\left\{\frac{\partial}{\partial B}\left(\frac{\partial n_j}{\partial \lambda}\right)\right\} > \frac{1}{\lambda_0}\left(\frac{\partial n_j}{\partial B}\right) \quad \text{Equation (13b)}$$

$$\left\{\frac{\partial}{\partial B}\left(\frac{\partial n_i}{\partial \lambda}\right)\right\} < \frac{1}{\lambda_0}\left(\frac{\partial n_i}{\partial B}\right)(i \neq j) \quad \text{Equation (13c)}$$

Assuming that each layer satisfies Equation (8), Equations (13b) and (13c) may be expressed as shown in Equation (14).

$$\frac{\partial n_i}{\partial B} > 0 \text{ and } \frac{\partial n_j}{\partial B} < 0 \quad \text{Equation (14)}$$

That is, when an effective refractive index change rate ($\partial n_i/\partial B$) of an i-th layer according to the change in the magnitude B of the phase delay at the required center wavelength is positive, an effective refractive index change rate $\partial n_j/\partial B$ of the j-th layer according to the change in the magnitude B is negative (Equation 14), and the magnitude of the dispersion change rate (($\partial/\partial B(\partial n_j/\partial \lambda)$)) compared to the effective refractive index change rate $\partial n_j/\partial B$ of the j-th layer according to the change in the magnitude B is greater than that of the i-th layer (Equation 13a), a phase delay profile with a small discontinuity in the operating wavelength range may be implemented by satisfying Equation (7).

The above conditions may be satisfied by using materials having different refractive indices and dispersions for unit components of each layer and using different design parameter spaces for each layer.

In the above description, n, φ, A, B, etc. are described as a function of wavelength by fixing a position based on a unit component, but n, φ, A, B, etc. may be expressed as a function of position. Therefore, in each layer of the meta-optical device 100, the above conditions may be satisfied by adjusting the effective refractive index change (∂n/∂r) according to the position and the dispersion change (∂/∂r (∂n/∂λ) according to the position.

Figure 6:
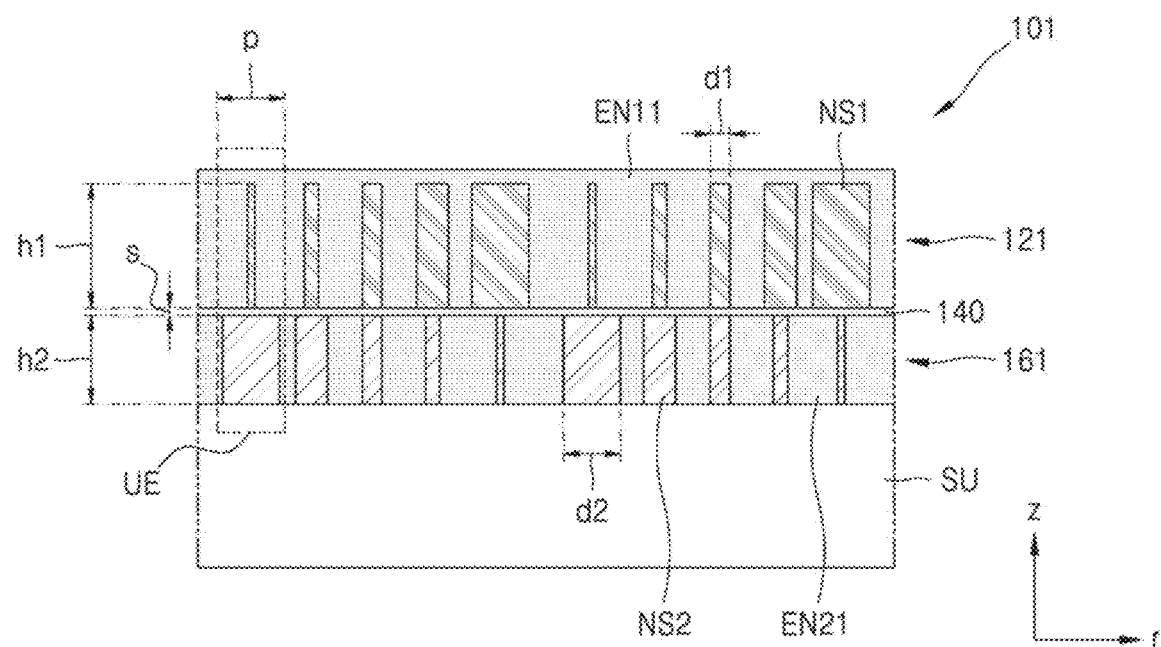
FIG. 6 is a cross-sectional view illustrating a schematic structure of a meta-optical device according to an example embodiment.
Figure 7A:
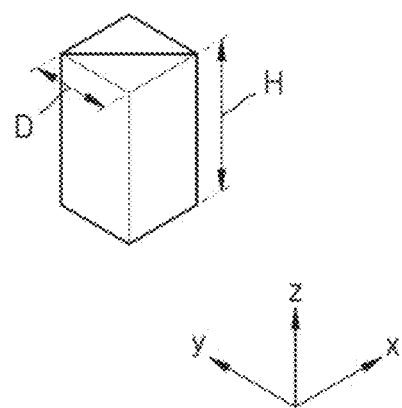
FIGS. 7A and 7B are perspective views illustrating shapes of nanostructures that may be employed in the meta-optical device of FIG. 6.
Figure 7B:
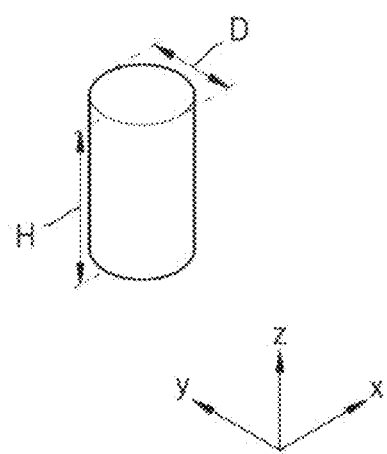

FIG. 6 is a cross-sectional view illustrating a schematic structure of a meta-optical device 101 according to an example embodiment, and FIGS. 7A and 7B are perspective views illustrating shapes of nanostructures that may be employed in the meta-optical device 101 of FIG. 6.

The meta-optical device 101 may include a first layer 121 and a second layer 161, and further include a substrate SU for supporting the first layer 121 and the second layer 161.

The first layer 121 includes a plurality of first nanostructures NS1 and a first surrounding material EN11 surrounding the first nanostructures NS1. The first nanostructure NS1 may have a width d1 and a height h1 determined according to a position. As shown, the heights h1 of the first nanostructures NS1 may be the same, but are not limited thereto.

The second layer 161 includes a plurality of second nanostructures NS2 and a second surrounding material EN21 surrounding the second nanostructures NS2. The second nanostructure NS2 may have a width d2 and a height h2 determined according to a position. As shown, the heights h2 of the second nanostructures NS2 may be the same, but are not limited thereto.

The substrate SU has a transparent property with respect to light in the operating wavelength band of the meta-optical device 101, and may include any one of glass (fused silica, BK7, etc.), quartz, polymer (PMMA, SU-8, etc.), and other transparent plastics.

The first nanostructure NS1 and the second nanostructure NS2 may have an aspect ratio greater than 1 to avoid optical resonance inside the structure. For example, h1/d1 and h2/d2 may be greater than 1, and, for example, may be greater than 2.

The first nanostructure NS1 and the second nanostructure NS2 at positions facing each other may form a repeating unit component UE. Detailed shapes included in the unit component UE, that is, the width d1 and the height h1 of the first nanostructure NS1, the width d2 and the height h2 of the second nanostructure NS2, and an arrangement period p of the unit component UE are set appropriately to a phase delay value required at each position.

The width d1, the width d2, and the period p may be dimensions of sub-wavelengths. That is, the width d1, the width d2, and the period p may be less than the center wavelength $\lambda_0$ of the operating wavelength band of the meta-optical device 101. The height h1 and the height h2 may be greater than $\lambda_0$. The height h1 and the height h2 may be greater than $\lambda_0$ and less than $10\lambda_0$.

A spacer layer 140 may be disposed between the first layer 121 and the second layer 161. The spacer layer 140 may have a refractive index lower than the refractive indices of the first nanostructure NS1 and the second nanostructure NS2. The spacer layer 140 may be the same material as the first surrounding material EN11 or may be the same material as the second surrounding material EN21. A thickness s of the spacer layer 140 may be 400 nm or less. The spacer layer 140 may be omitted. In other words, the thickness s of the spacer layer 140 may be 0.

The first nanostructure NS1 and the second nanostructure NS2 may be structures in the pillar shape. For example, the first nanostructure NS1 and the second nanostructure NS2 may have a square pillar shape as shown in FIG. 7A or a cylindrical shape as shown in FIG. 7B. In FIGS. 7A and 7B, the width D may correspond to d1 or d2, and the height H may correspond to h1 or h2. In addition, various pillar shapes having a cross-sectional shape of a rectangle, a cross, a polygon, or an ellipse may be applied to the first nanostructure NS1 and the second nanostructure NS2.

In the example embodiment, the first nanostructure NS1 may have a higher refractive index than the first surrounding material EN11, and the second nanostructure NS2 may have a higher refractive index than the second surrounding material EN21. According to this refractive index arrangement, the first nanostructures NS1 and the second nanostructures NS2 may be set to be opposite to each other in the pattern that the widths d1 and d2 change along one direction away from the center of the meta-optical device 101. Accordingly, the first layer 121 and the second layer 161 may have opposite signs of an effective refractive index change rate according to a position. In addition, the material, shape dimension, etc. included in the unit component UE may be set according to positions such that the first layer 121 and the second layer 161 have different ratios of the dispersion change rate to the effective refractive index change.

Any one of the first layer 121 and the second layer 161 may be a phase delay layer that represents a phase profile of the same pattern as that of a target phase profile to be implemented by the meta-optical device 101. For example, any one of the first layer 121 and the second layer 161 may have an effective refractive index change rate of the same pattern as that of the target phase profile according to the position, and the other layer may be a dispersion adjustment layer that represents an effective refractive index change rate opposite to pattern of that of the target phase profile.

A layer, which is the dispersion adjustment layer, may be set to have a change pattern of the material and the width such that the ratio of the dispersion change rate to the effective refractive index change is greater than that of the other layer.

In the example embodiment, the first nanostructure NS1 may have a smaller refractive index than the first surrounding material EN11, and the second nanostructure NS2 may have a smaller refractive index than the second surrounding material EN21.

Hereinafter, the meta-optical device 101 according to various example embodiments will be described. In the following description of the example embodiments, differences from the meta-optical device 101 of FIG. 6 will be mainly described, and the above description may be applied to components that are not described.

Figure 8:
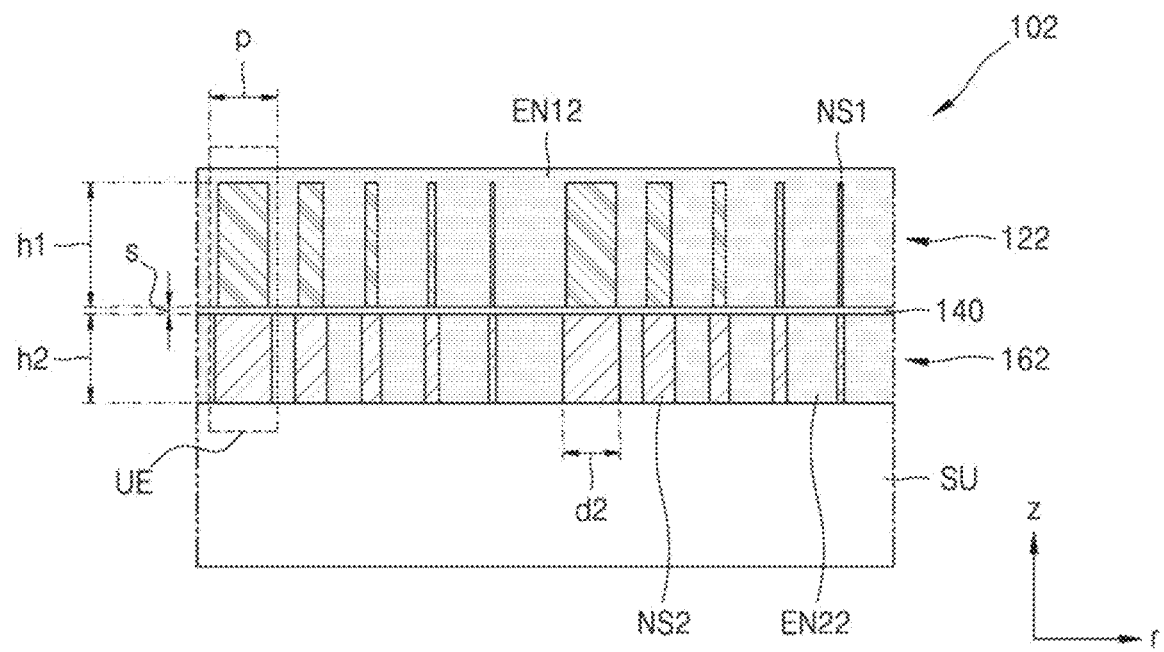
FIG. 8 is a cross-sectional view illustrating a schematic structure of a meta-optical device according to another example embodiment.

FIG. 8 is a cross-sectional view illustrating a schematic structure of a meta-optical device 102 according to another example embodiment.

The meta-optical device 102 includes a first layer 122, a second layer 162, and the substrate SU supporting the first layer 122 and the second layer 162. The first layer 122 includes the plurality of first nanostructures NS1 and the first surrounding material EN12 surrounding the first nanostructures NS1. The second layer 162 includes the plurality of second nanostructures NS2 and the second surrounding material EN22 surrounding the second nanostructures NS2.

In the example embodiment, unlike the meta-optical device 101 of FIG. 6, the first nanostructure NS1 may have a lower refractive index than the first surrounding material EN12. The second nanostructure NS2 may have a higher refractive index than the second surrounding material EN22.

In such a refractive index arrangement, the first nanostructures NS1 and the second nanostructures NS2 may be set to be the same as each other in the pattern that the widths d1 and d2 of the one direction change along one direction away from the center of the meta-optical device 102. Accordingly, the first layer 122 and the second layer 162 have opposite signs of an effective refractive index change rate according to a position. In addition, materials included in each of the first layer 122 and the second layer 162 and a degree of the pattern in which the width changes may be set such that the first layer 122 and the second layer 162 have different ratios of the dispersion change rate to the effective refractive index change.

In the example embodiment, the first nanostructure NS1 may be modified to have a higher refractive index than the first surrounding material EN12, and the second nanostructure NS2 may be modified to have a lower refractive index than the second surrounding material EN22.

Figure 9:
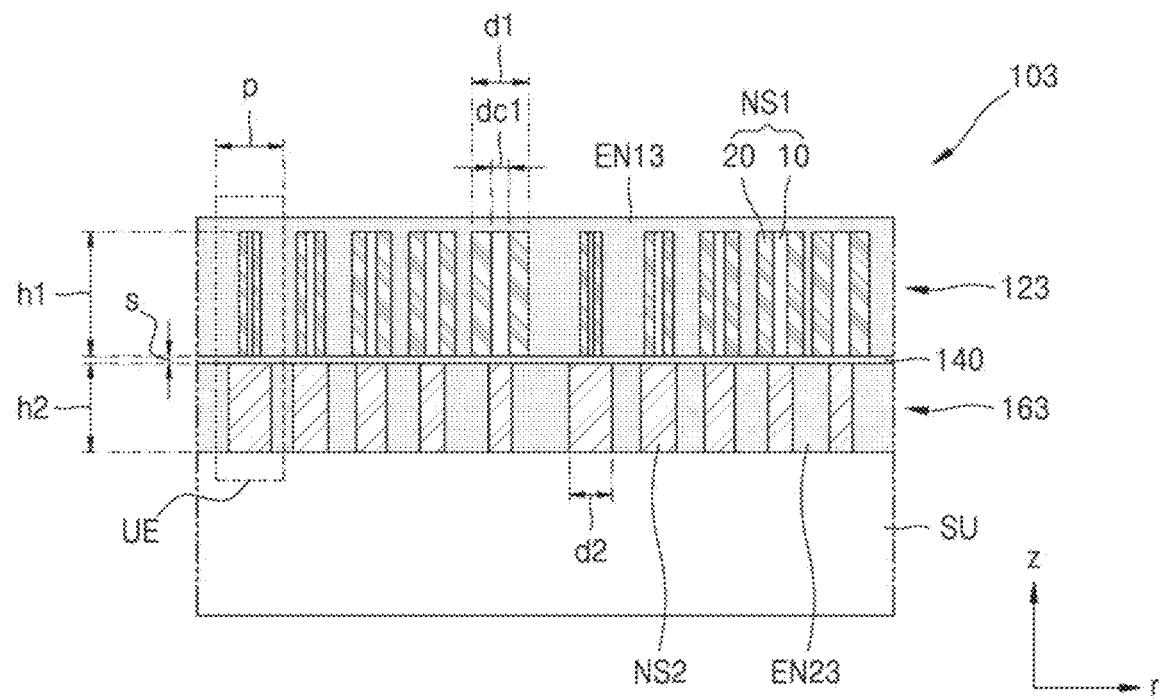
FIG. 9 is a cross-sectional view illustrating a schematic structure of a meta-optical device according to another example embodiment.
Figure 10A:
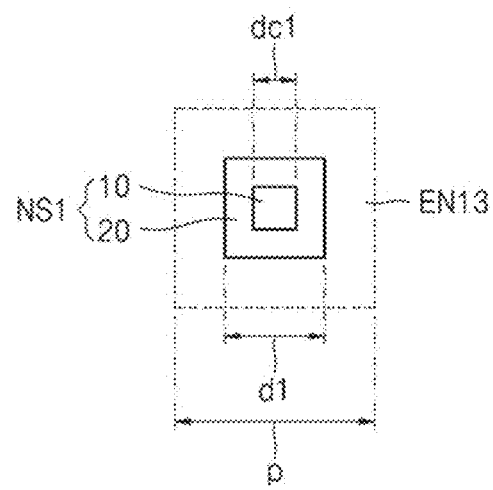
FIGS. 10A and 10B are plan views illustrating shapes of first nanostructures that may be employed in a first layer of the meta-optical device of FIG. 9.
Figure 10B:
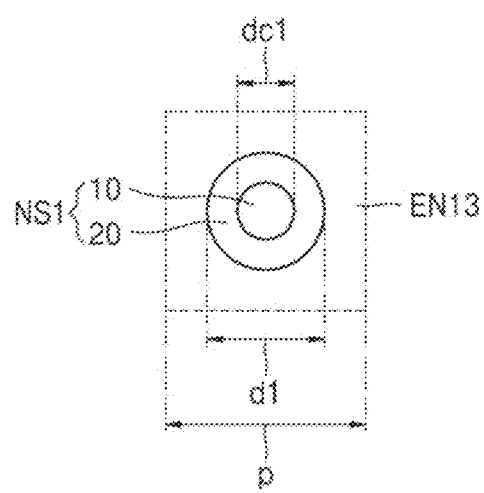

FIG. 9 is a cross-sectional view illustrating a schematic structure of a meta-optical device 103 according to another example embodiment. FIGS. 10A and 10B are plan views illustrating shapes of the first nanostructures NS1 that may be employed in a first layer 123 of the meta-optical device 103 of FIG. 9.

The meta optical device 103 includes the first layer 123, a second layer 163, and the substrate SU supporting the first layer 123 and the second layer 163.

The first layer 123 includes the plurality of first nanostructures NS1 and the first surrounding material EN13 surrounding the first nanostructures NS1. The second layer 163 includes a plurality of second nanostructures NS2 and a second surrounding material EN23 surrounding the second nanostructures NS2.

The first nanostructure NS1 may have a shape including an inner pillar 10 having a width dc1 and a shell pillar 20 surrounding the inner pillar 10 having a width of d1. The refractive index of the inner pillar 10 may be lower than the refractive index of the shell pillar 20, and the refractive index of the shell pillar 20 may be higher than the refractive index of the first surrounding material EN13.

The second nanostructure NS2 may have a higher refractive index than the second surrounding material EN23.

In such a refractive index arrangement, the first nanostructures NS1 and the second nanostructures NS2 may be set to be opposite to each other in the pattern that the widths of the one direction change along one direction away from the center of the meta-optical device 103. Accordingly, the first layer 123 and the second layer 163 have opposite signs of an effective refractive index change rate according to a position. In addition, details of the unit component UE may be set such that the first layer 123 and the second layer 163 have different ratios of the dispersion change rate to the effective refractive index change.

Any one of the first layer 123 and the second layer 163 may be a phase delay layer indicating a phase profile of the same pattern as a target phase profile to be implemented by the meta-optical device 103, and the other layer may be a dispersion adjustment layer.

Meanwhile, when the first nanostructure NS1 provided in the first layer 123 is filled with the inner pillar 10 of a low refractive index in the shell pillar 20 of a high refractive index, a phenomenon in which as the width d1 of the first nanostructure NS1 increases, the effective refractive index rapidly increases may be alleviated, and it is advantageous to minimize a dispersion change according to the position. In this respect, it is advantageous for the first layer 123 to be used as a phase delay layer representing a phase profile of the same pattern as the target phase profile to be implemented by the meta-optical device 103. The second layer 163 is a dispersion adjustment layer, and may be set in detail to have the change pattern of the material and width such that the ratio of the dispersion change rate to the effective refractive index change rate of the second layer 163 is greater than the ratio of the dispersion change rate to the effective refractive index change rate of the first layer 123.

Figure 11:
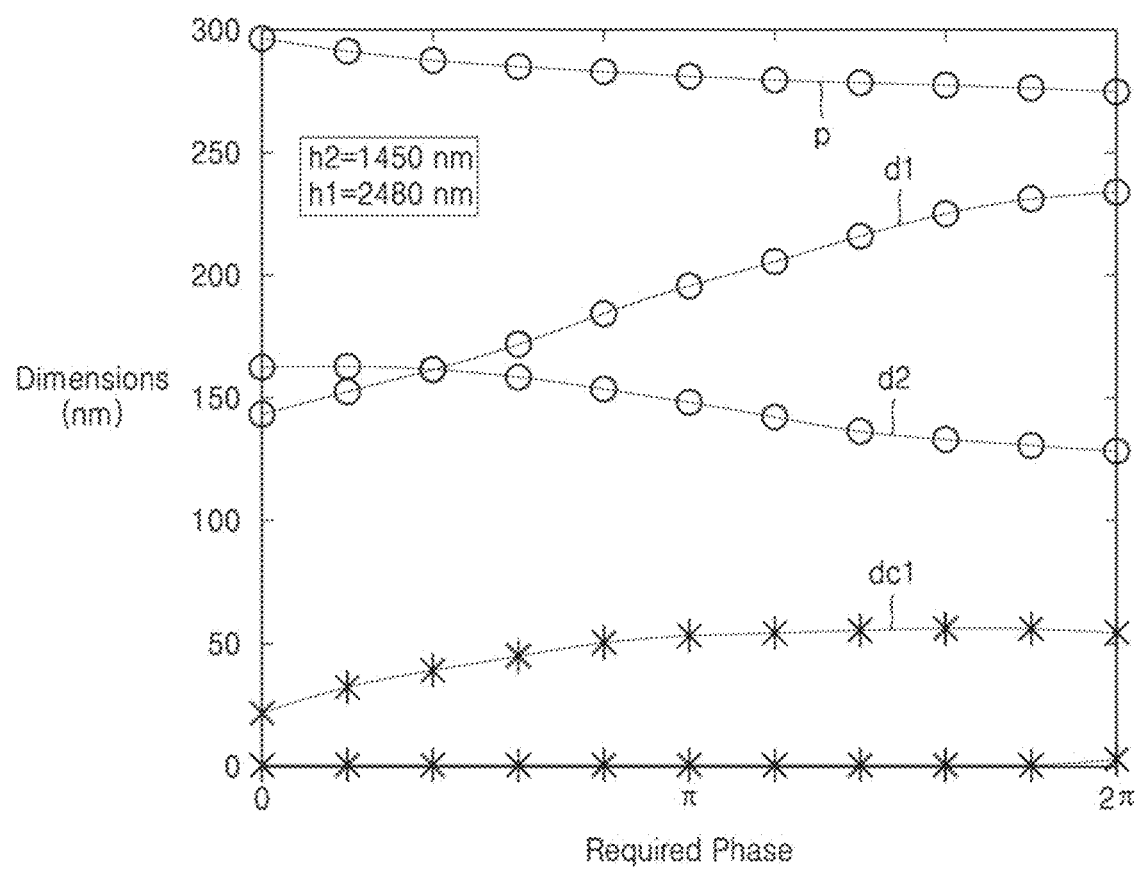
FIG. 11 is a graph illustrating a phase delay according to detailed dimensions of a first nanostructure constituting a first layer of the meta-optical device of FIG. 9.

FIG. 11 is a graph illustrating a relationship between detailed dimensions of a unit component of the meta optical device 103 of FIG. 9 and a phase delay.

The graph relates to a case in which the first nanostructure NS1 is set to have a shape as shown in FIG. 10A and the second nanostructure NS2 is set to have a shape as shown in FIG. 7A. In the graph, the height of the first nanostructure NS1 and the heights h1 and h2 of the second nanostructure NS2 are fixed to constant values. The width d1 of the first nanostructure NS1, the width d2 of the second nanostructure NS2, the width dc1 of the inner pillar 10 included in the second nanostructure NS2, and an arrangement period p of the unit components UE change, and a phase delay of light transmitted through the unit component UE is shown.

Detailed dimensions of the unit component UE suitable for a required phase delay value may be set from this graph. In addition, graph different values of h1 and h2 may also be obtained, and from these graphs, detailed dimensions of the unit components UE for each position may be set suitable for the target phase profile to be implemented.

Figure 12:
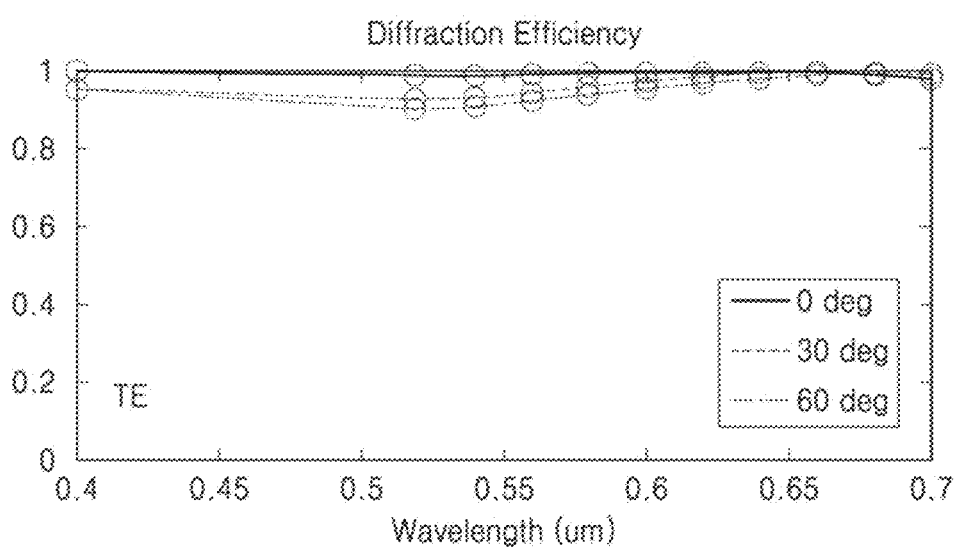
FIGS. 12 and 13 are graphs illustrating diffraction efficiency of the meta optical device of FIG. 9.
Figure 13:
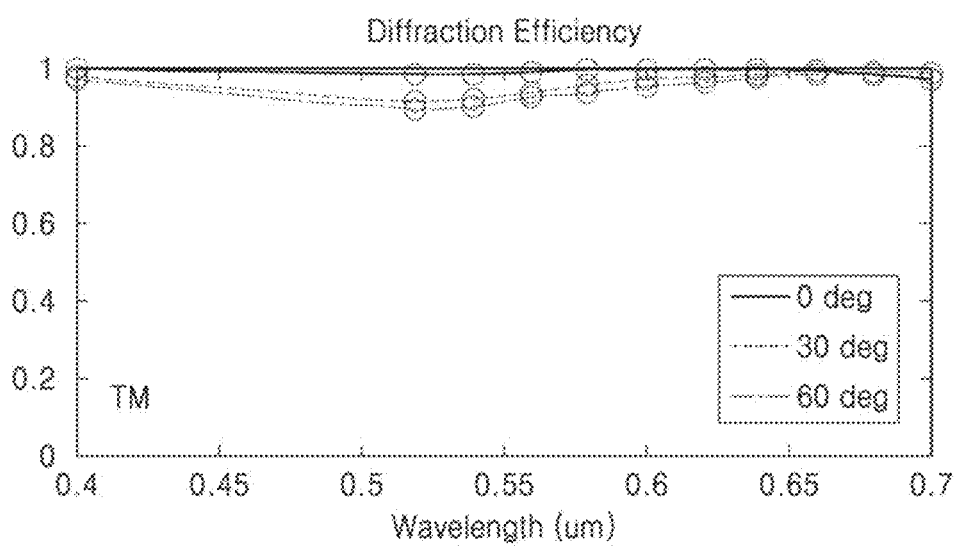

FIGS. 12 and 13 are graphs illustrating diffraction efficiency of the meta optical device 103 of FIG. 9.

FIGS. 12 and 13 illustrate diffraction efficiency in a wavelength band of 400 nm to 700 nm with incidence angles of 0°, 30°, and 60° with respect to light in a transverse electric (TE) mode and a transverse magnetic (TM) mode, respectively.

The diffraction efficiency represents the energy ratio of the light diffracted in the intended diffraction direction in the light transmitted through the meta-optical device 103. As shown in the graph, the diffraction efficiency in the desired wavelength band has a high value that is 0.8 or more, and almost 0.9 or more. This high diffraction efficiency may be attributed to the fact that the meta-optical device 103 is designed to implement a target phase delay profile with little phase discontinuity in the wavelength band.

Figure 14:
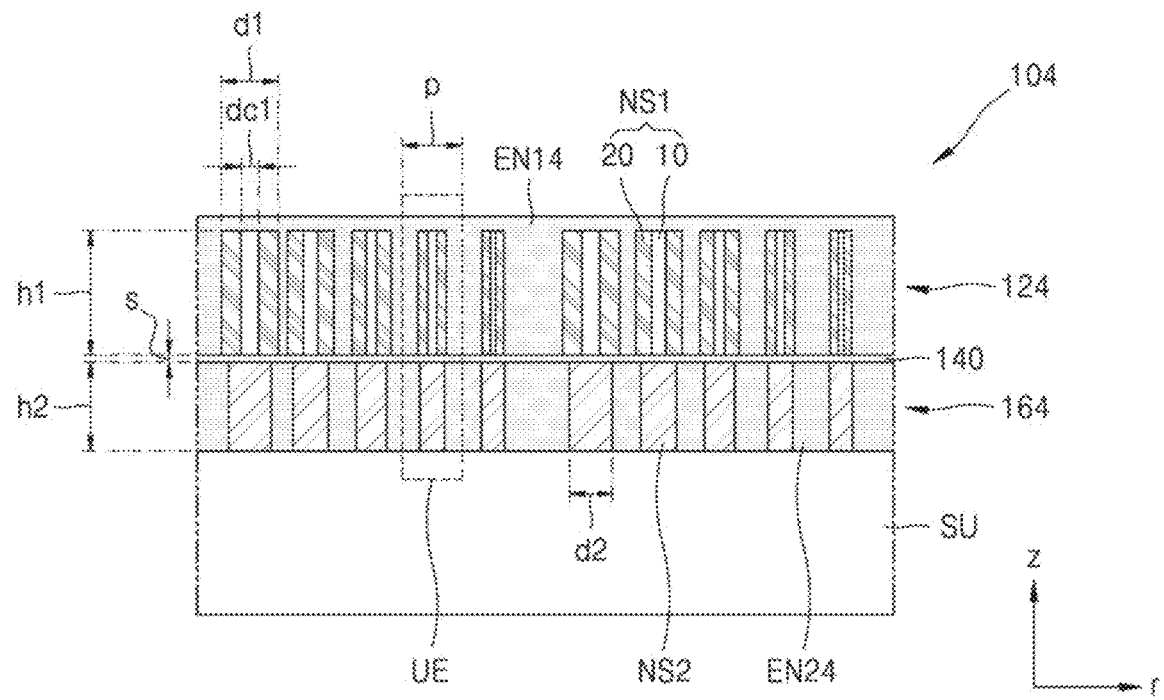
FIG. 14 is a cross-sectional view illustrating a schematic structure of a meta-optical device according to another example embodiment.

FIG. 14 is a cross-sectional view illustrating a schematic structure of a meta-optical device 104 according to another example embodiment.

A first layer 124 of the meta optical device 104 includes the plurality of first nanostructures NS1 and a first surrounding material EN14 surrounding the first nanostructures NS1. A second layer 164 of the meta-optical device 104 includes the plurality of second nanostructures NS2 and a second surrounding material EN24 surrounding the second nanostructures NS2.

The first nanostructure NS1 may have a shape including the inner pillar 10 having the width dc1 and the shell pillar 20 having a width d1 surrounding the inner pillar 10. The refractive index of the inner pillar 10 may be lower than the refractive index of the shell pillar 20, and the refractive index of the shell pillar 20 may be higher than the refractive index of the first surrounding material EN14.

Unlike the meta-optical device 103 of FIG. 9, in the meta-optical device 104 of the example embodiment according to FIG. 14, the second nanostructure NS2 may have a lower refractive index than the second peripheral material EN24.

In such a refractive index arrangement, the first nanostructures NS1 and the second nanostructures NS2 may be set to be same as each other in the pattern that the widths of the one direction change along one direction away from the center of the meta-optical device 104. Accordingly, the first layer 124 and the second layer 164 have opposite signs of an effective refractive index change rate according to a position. In addition, materials included in each of the first layer 124 and the second layer 164 and a degree of the pattern in which the width changes may be set such that the first layer 124 and the second layer 164 have different ratios of the dispersion change rate to the effective refractive index change.

The first layer 124 may be a phase delay layer representing a phase profile of the same pattern as a target phase profile to be implemented by the meta-optical device 104, and the second layer 164 may be a dispersion adjustment layer and may be set to have details of the unit component UE for each position such that the ratio of the dispersion change rate to the effective refractive index change rate of the second layer 164 is greater than the ratio of the dispersion change rate to the effective refractive index change rate of the first layer 124.

Figure 15:
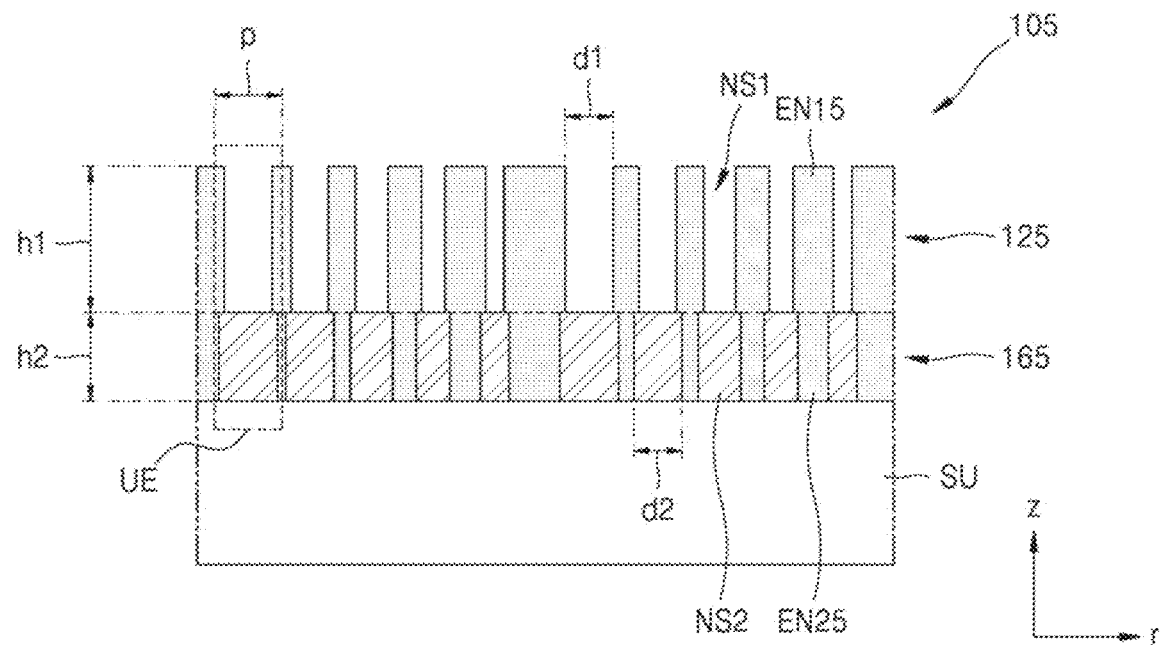
FIG. 15 is a cross-sectional view illustrating a schematic structure of a meta-optical device according to another example embodiment.

FIG. 15 is a cross-sectional view illustrating a schematic structure of a meta-optical device 105 according to another example embodiment.

A first layer 125 of the meta-optical device 105 includes the plurality of first nanostructures NS1 and a first surrounding material EN15 surrounding the first nanostructures NS1. A second layer 165 of the meta-optical device 105 includes the plurality of second nanostructures NS2 and a second surrounding material EN25 surrounding the second nanostructures NS2.

The first nanostructure NS1 has a hole shape surrounded by the first surrounding material EN15, and the inside of the hole has a structure that is empty, that is, filled with air. The first nanostructure NS1 has a refractive index of 1, and has a lower refractive index than the first surrounding material EN15.

The second nanostructure NS2 has a higher refractive index than the second surrounding material EN25.

Detailed values of the unit component UE are set for each position such that the holes of the first nanostructures NS1 and the second nanostructures NS2 are set to be the same as each other in the pattern that widths of the one direction change along one direction away from the center of the meta-optical device 105. Accordingly, the first layer 125 and the second layer 165 have opposite signs of an effective refractive index change rate according to a position. In addition, materials included in the first layer 125 and the second layer 165 and a degree of the pattern in which the width changes may be set such that the first layer 125 and the second layer 165 have different ratios of the dispersion change rate to the effective refractive index change.

The first layer 125 may be a phase delay layer indicating a phase profile of the same pattern as a target phase profile to be implemented by the meta-optical device 105. The second layer 165 may be a dispersion adjustment layer and may be set to have details of the unit component UE for each position such that the ratio of the dispersion change rate to the effective refractive index change rate of the second layer 165 is greater than the ratio of the dispersion change rate to the effective refractive index change rate of the first layer 125.

Figure 16:
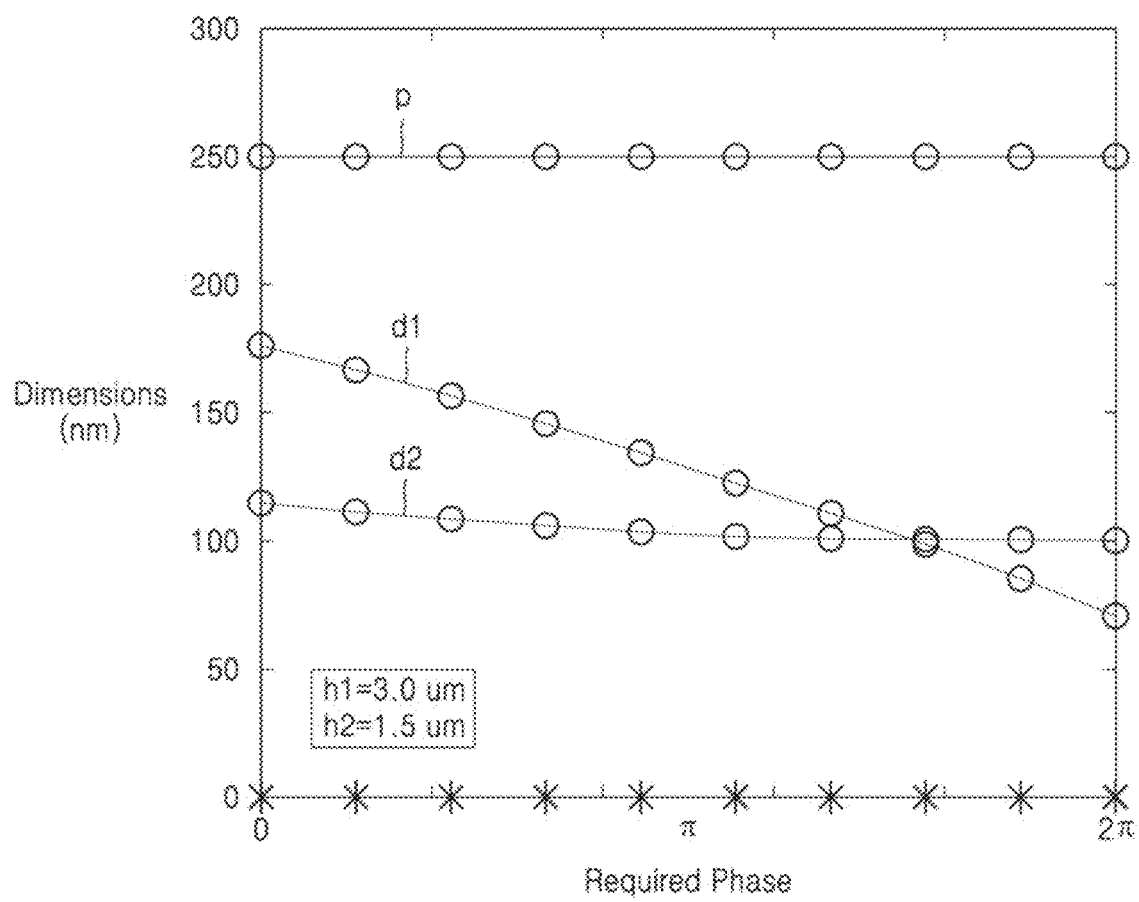
FIG. 16 is a graph illustrating a phase delay according to detailed dimensions of a first nanostructure constituting a first layer of the meta-optical device of FIG. 15.

FIG. 16 is a graph illustrating a phase delay according to detailed dimensions of the first nanostructure NS1 constituting a first layer of the meta-optical device 105 of FIG. 15.

The graph shows that a hole of the first nanostructure NS1 has a square cross-section, and the second nanostructure NS2 is set to the shape as shown in FIG. 7A. In the graph, the height of the first nanostructure NS1 and the height of the second nanostructure NS2 are fixed, the width d1 of the first nanostructure NS1, the width d2 of the second nanostructure NS2, and the arrangement period p of the unit component UE vary, and a phase delay accordingly is shown.

Detailed dimensions of the unit component UE suitable for a required phase delay value may be set from this graph. In addition, graph of different values of heights h1 and h2 may also be obtained, and from these graphs, detailed dimensions of the unit components UE for each position may be set suitable for the target phase profile to be implemented.

Figure 17:
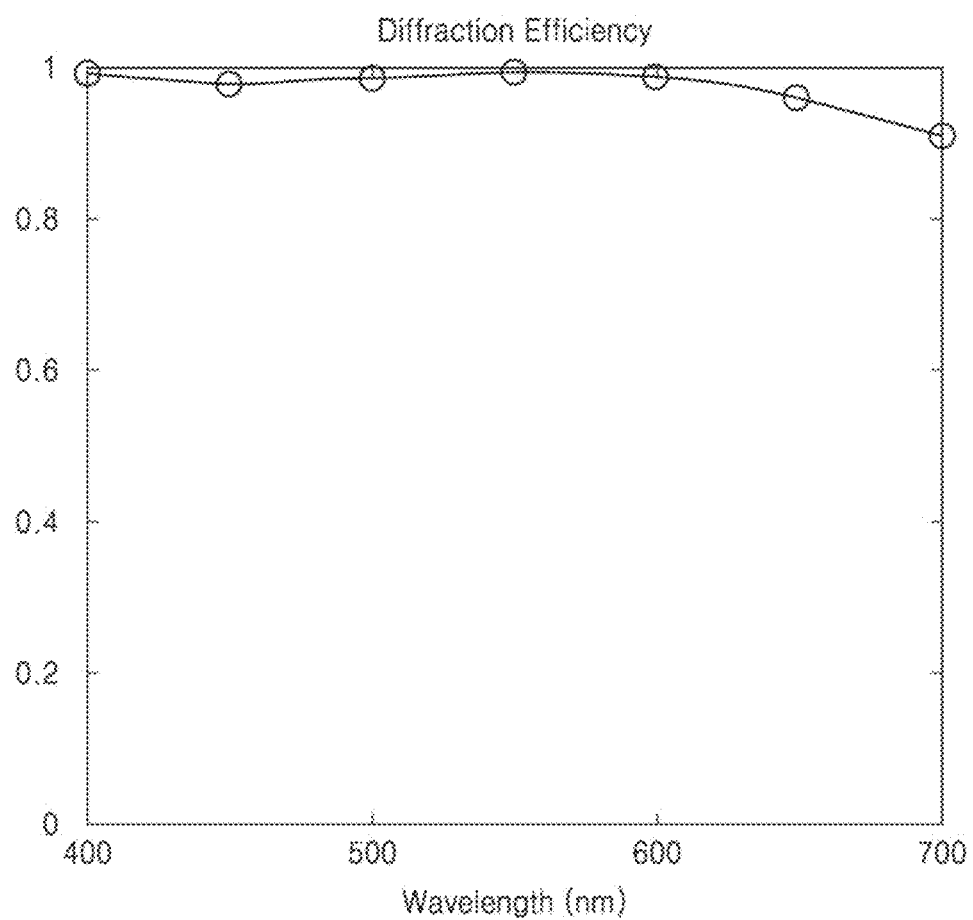
FIG. 17 is a graph illustrating diffraction efficiency of the meta optical device of FIG. 15.

FIG. 17 is a graph illustrating diffraction efficiency of the meta optical device 105 of FIG. 15.

The graph relates to incident light with an incidence angle of 0° and illustrates a high value of 0.9 or more in the wavelength range of 400 nm to 700 nm, and diffraction efficiency close to 1 in most wavelength bands.

This result is analyzed that the diffraction efficiency is higher than that of the meta-optical device 103 according to the example embodiment of FIG. 9 in which the shape of the first nanostructure NS1 has the inner pillar 10 having a low refractive index and the shell pillar 20 having a high refractive index surrounding the inner pillar 10. Based on using a hollow hole structure, adjustment of the desired dispersion may be easier.

Figure 18:
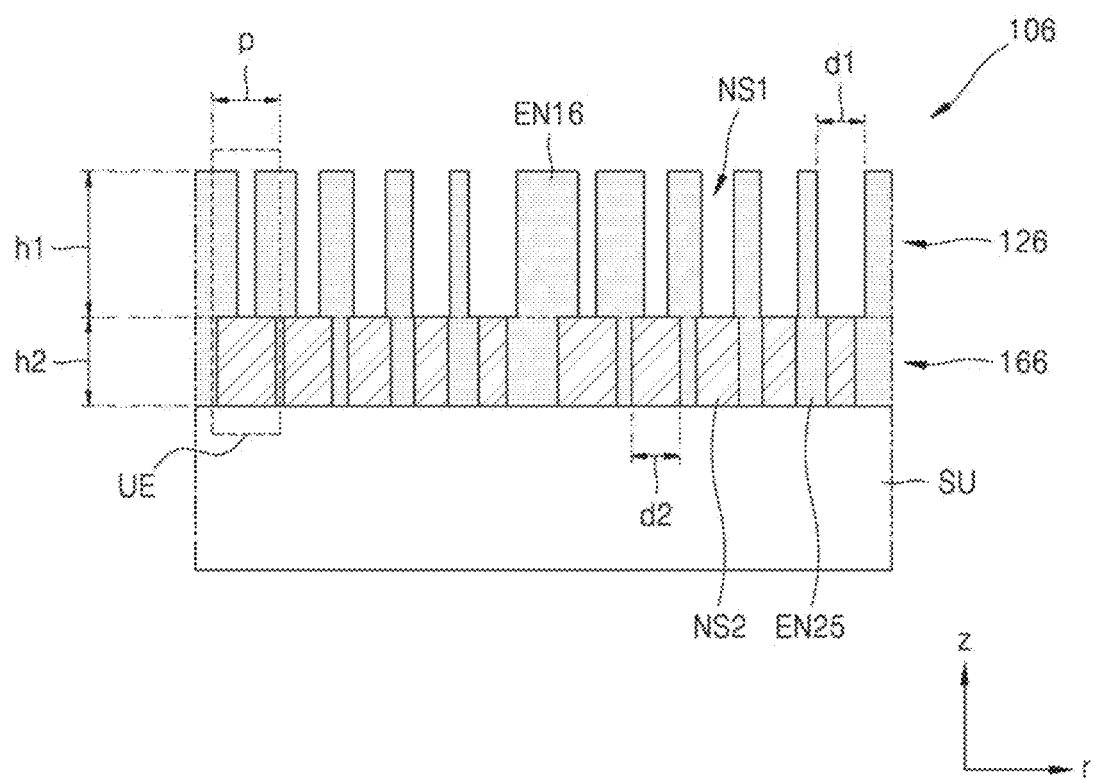
FIG. 18 is a cross-sectional view illustrating a schematic structure of a meta-optical device according to another example embodiment.

FIG. 18 is a cross-sectional view illustrating a schematic structure of a meta-optical device 106 according to another example embodiment.

A first layer 126 of the meta-optical device 106 includes the plurality of first nanostructures NS1 and a first surrounding material EN16 surrounding the first nanostructures NS1. A second layer 166 of the meta-optical device 106 includes the plurality of second nanostructures NS2 and a second surrounding material EN26 surrounding the second nanostructures NS2.

The first nanostructure NS1 has a hole shape surrounded by the first surrounding material EN16, and the inside of the hole has a structure that is empty, that is, filled with air. The first nanostructure NS1 has a refractive index of 1, and has a lower refractive index than the first surrounding material EN16.

Unlike the meta-optical device 105 of FIG. 15, in the meta-optical device 106 of the example embodiment according to FIG. 18, the second nanostructure NS2 has a lower refractive index than the second peripheral material EN26.

Detailed values of the unit component UE are set for each position such that the holes of the first nanostructures NS1 and the second nanostructures NS2 are set to be opposite to each other in the pattern that widths of the one direction change along one direction away from the center of the meta-optical device 106. Accordingly, the first layer 126 and the second layer 166 have opposite signs of an effective refractive index change rate according to a position. In addition, materials included in the first layer 126 and the second layer 166 and a degree of the pattern in which the width changes may be set such that the first layer 126 and the second layer 166 have different ratios of the dispersion change rate to the effective refractive index change.

The first layer 126 may be a phase delay layer indicating a phase profile of the same pattern as a target phase profile to be implemented by the meta-optical device 106. The second layer 166 may be a dispersion adjustment layer and may be set to have details of the unit component UE for each position such that the ratio of the dispersion change rate to the effective refractive index change rate of the second layer 165 is greater than the ratio of the dispersion change rate to the effective refractive index change rate of the first layer 126.

It is described that in the meta-optical devices 103, 104, 105, and 106 of FIGS. 9, 14, 15, and 18, the first layers 123, 124, 125, and 126 may function as layers (phase delay layers) representing the effective refractive index change (and the phase delay profile) of the same pattern as the target phase delay profile, the second layers 163, 164, 165, and 166 may function as layers (dispersion adjustment layers) representing the effective refractive index change (and the phase delay profile) of the opposite pattern to the target phase delay profile, but embodiments are not limited thereto. The example embodiments describes that there is an advantage in that a nanostructure having a hole shape or a shape including an inner pillar and a shell pillar is applied as a phase delay layer, and it is also possible to apply the structure as a nanostructure of the dispersion adjustment layer according to a refractive index distribution.

The above-described meta-optical devices may exhibit various optical functions such as a lens, a beam deflector, and a beam shaper, and may exhibit various optical functions by being combined with general optical elements. For example, when the phase delay dispersion ($A=\partial\varphi/\partial\lambda$) is 0, the meta-optical device implemented as the lens may exhibit a predetermined chromatic aberration that is a negative chromatic aberration in which the wavelength is inversely proportional to the focal length. The chromatic aberration has the opposite pattern to a positive chromatic aberration that a general refractive lens exhibits and which indicates that the focal length is proportional to the wavelength. This property may also be expressed as a negative Abbe number. Accordingly, the meta-optical device may exhibit a predetermined refractive power by being combined with general refractive lenses, and may be configured to correct chromatic aberration of the refractive lenses.

Example embodiments are based on the phase delay profile illustrated in FIG. 5, that is, the phase delay dispersion ($A=\partial\varphi/\partial\lambda$) according to the wavelength, being 0. However, by adopting a layer of the same pattern of the refractive index change as the target phase delay profile and a layer of the opposite pattern of the refractive index change, and adjusting the ratio of the refractive index change rate to the effective refractive index change rate in each layer according to the position, a meta-optical device that has the phase delay dispersion ($A=\partial\varphi/\partial\lambda$) that is non-zero, that is, $A>0$, or $A<0$, and exhibits a phase lag profile with little phase discontinuity may be implemented.

Figure 19:
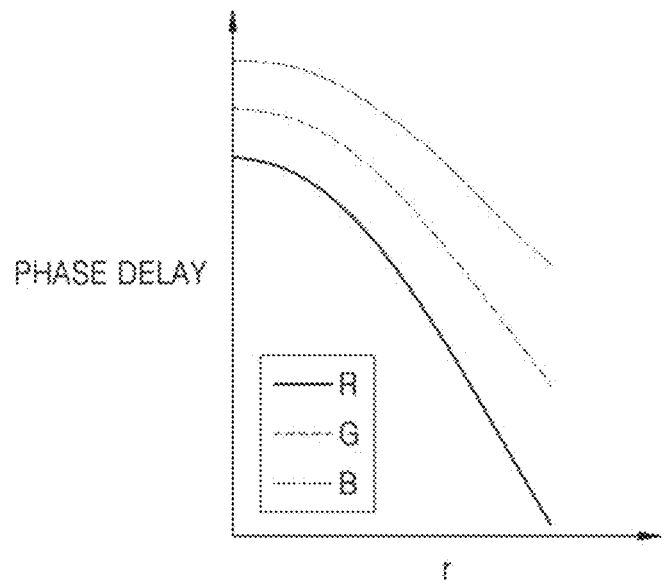
FIG. 19 is a graph illustrating a phase delay profile for each wavelength by a meta optical device according to another example embodiment.

FIG. 19 is a graph illustrating a phase delay profile for each wavelength by an optical meta-optical device according to another example embodiment. Here, R, G, and B may be a relatively long wavelength, a medium wavelength, and a short wavelength, respectively. For example, R may be 700 nm, G may be 550 nm, and B may be 400 nm.

The phase delay profile includes all of a region in which the phase delay dispersion ($\partial\varphi/\partial\lambda$) with respect to the wavelength is less than 0, a region in which the phase delay dispersion ($\partial\varphi/\partial\lambda$) with respect to the wavelength is 0, and a region in which the phase delay dispersion ($\partial\varphi/\partial\lambda$) with respect to the wavelength is greater than 0. Assuming that r0 is a position where the phase delay dispersion ($\partial\varphi/\partial\lambda$) is 0 (the position where the inclination of a reference phase profile is the same as the phase delay dispersion), the phase delay dispersion ($\partial\varphi/\partial\lambda$) in a region where a position r is less than r0 is less than 0, and the phase delay dispersion ($\partial\varphi/\partial\lambda$) in a region where the position r is greater than r0 is greater than 0.

When the target phase delay profile is configured such that the dispersion with respect to the wavelength has such a form as illustrated in FIG. 19, optical performance having a chromatic aberration greater than that of a general optical element may be exhibited. This chromatic aberration is a negative chromatic aberration representing a focal length inversely proportional to the wavelength, and may be greater than that of a metalens with a phase delay dispersion ($\partial\varphi/\partial\lambda$) of 0, and much greater than that of a general refractive lens. Because this property is a phase delay profile that makes chromatic aberration larger, it may be utilized for a function of separating incident light based on wavelength. For example, when a beam deflector is implemented with the target phase delay profile, incident light may be deflected in a different direction according to the wavelength. In addition, the target phase delay profile may be used in a microscopic spectrometer that diverges incident light based on wavelength. In addition, when the beam shaper is implemented with the target phase delay profile, a different beam distribution may be formed according to the wavelength of incident light.

Figure 20:
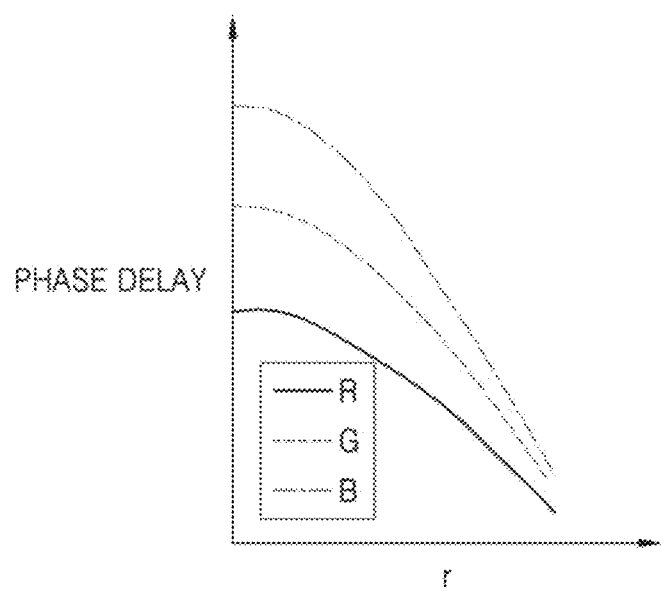
FIG. 20 is a graph illustrating a phase delay profile for each wavelength by a meta optical device according to another example embodiment.

FIG. 20 is a graph illustrating a phase delay profile for each wavelength by an optical meta-optical device according to another example embodiment. Here, R, G, and B may be long, medium, and short wavelengths, respectively. For example, R may be 700 nm, G may be 550 nm, and B may be 400 nm.

The phase delay profile includes a region in which the phase delay dispersion ($\partial\varphi/\partial\lambda$) with respect to a wavelength is less than 0, a region in which the phase delay dispersion ($\partial\varphi/\partial\lambda$) with respect to the wavelength is 0, and a region in which the phase delay dispersion ($\partial\varphi/\partial\lambda$) with respect to the wavelength is greater than 0. When r0 is the position where the phase delay dispersion ($\partial\varphi/\partial\lambda$) is 0 (the position where an inclination of a reference phase profile is the same as a phase delay dispersion), the phase delay dispersion ($\partial\varphi/\partial\lambda$) in the region where the position r is less than r0 is greater than 0, and the phase delay dispersion ($\partial\varphi/\partial\lambda$) in the region where the position r is greater than r0 is less than 0.

When a target phase delay profile is configured such that the dispersion with respect to the wavelength has such a form as illustrated in FIG. 20, the meta-optical device may exhibit an achromatic optical performance. For example, when the meta-optical device is a lens, incident light is focused without a deviation according to the wavelength. For example, when such a meta-optical device is a beam deflector, the incident light exhibits a constant deflection angle without a variation according to the wavelength. For example, when the meta-optical device is a beam shaper, the incident light has a beam distribution of a predetermined pattern without a variation according to the wavelength.

The above-described meta-optical devices may exhibit various optical functions by setting the target phase profile in accordance with the optical performance in a desired wavelength band. In addition, because the phase discontinuity may be minimized, light efficiency indicating the above-described optical function may increase. In addition, because the sign of the phase delay dispersion ($\partial\varphi/\partial\lambda$) according to the wavelength may be adjusted to be 0, greater than 0, or less than 0, various types of performance may be implemented.

The above-described meta-optical devices may be applied to various electronic apparatuses. For example, the meta-optical devices may be mounted on electronic apparatuses such as smartphones, wearable devices, Internet of Things (IoT) devices, home appliances, tablet personal computers (PCs), personal digital assistants (PDAs), portable multimedia players (PMPs), navigation devices, drones, robots, unmanned vehicles, autonomous vehicles, advanced driver assistance systems (ADAS), etc.

Figure 21:
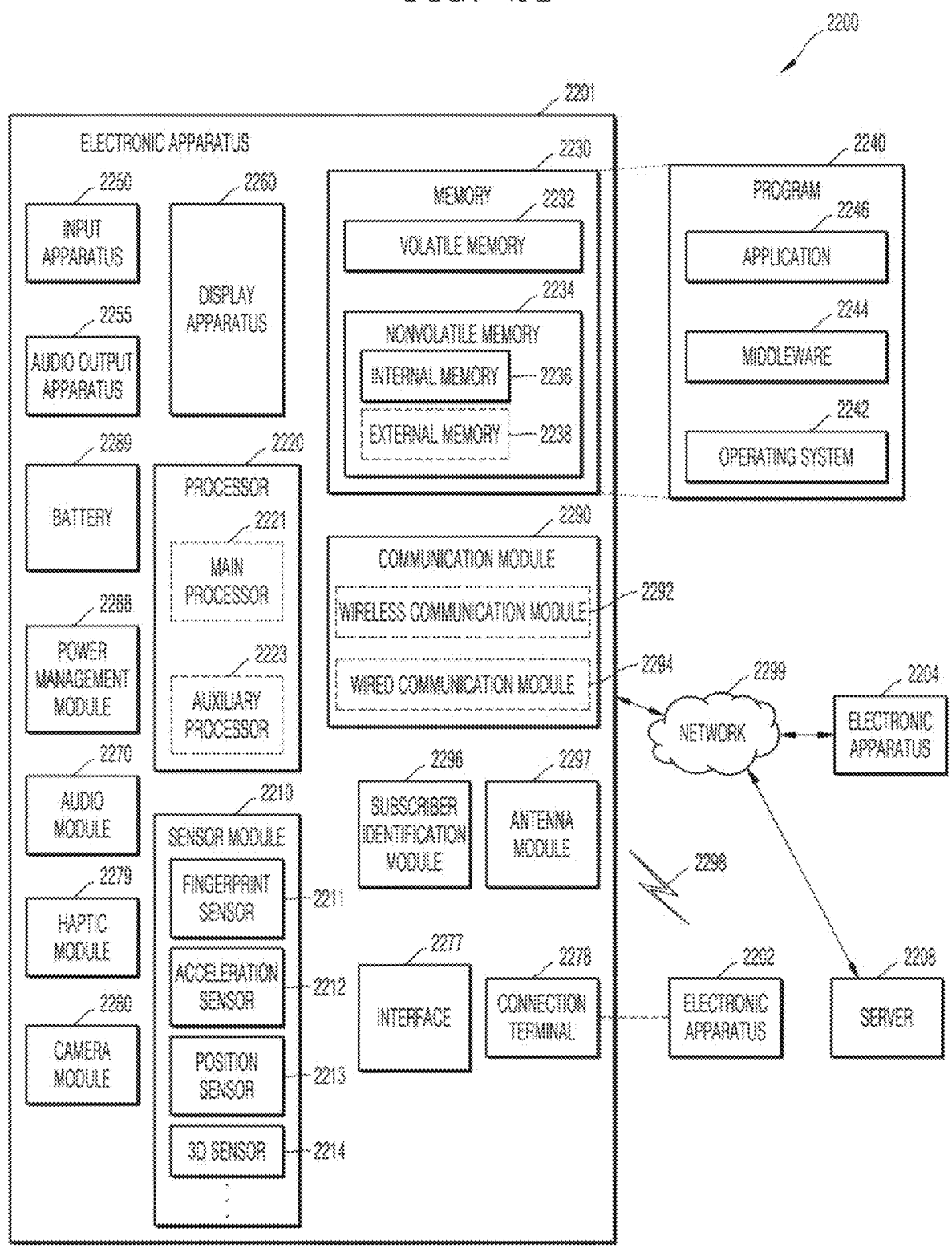
FIG. 21 is a block diagram illustrating a schematic configuration of an electronic apparatus according to an example embodiment.

FIG. 21 is a block diagram illustrating a schematic configuration of an electronic apparatus 2201 according to an example embodiment.

Referring to FIG. 21, in a network environment 2200, the electronic apparatus 2201 may communicate with another electronic apparatus 2202 through a first network 2298 (a short-range wireless communication network, etc.) or communicate with another electronic apparatus 2204 and/or a server 2208 through a second network 2299 (a remote wireless communication network, etc.) The electronic apparatus 2201 may communicate with the electronic apparatus 2204 through the server 2208. The electronic apparatus 2201 may include a processor 2220, a memory 2230, an input apparatus 2250, an audio output apparatus 2255, a display apparatus 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. The electronic apparatus 2201 may exclude some (the display apparatus 2260, etc.) of these components or further include other components. Some of these components may be implemented as one integrated circuit. For example, a fingerprint sensor 2211 of the sensor module 2210, an iris sensor, an illuminance sensor, or the like may be implemented by being embedded in the display apparatus 2260, for example, a display, etc.

The processor 2220 may execute software (a program 2240, etc.) to control one or a plurality of other components (hardware and software components, etc.) of the electronic apparatus 2201 connected to the processor 2220 and perform various data processing or operations. As part of data processing or operations, the processor 2220 may load commands and/or data received from other components (the sensor module 2210, the communication module 2290, etc.) to a volatile memory 2232, process the commands and/or the data stored in the volatile memory 2232, and store result data in a nonvolatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may operate independently or together. The auxiliary processor 2223 may use less power than the main processor 2221 and may perform a specialized function.

The auxiliary processor 2223 may control functions and/or states related to some (the display apparatus 2260, the sensor module 2210, the communication module 2290, etc.) of the components of the electronic apparatus 2201 in replacement of the main processor 2221 while the main processor 2221 is in an inactive state (a sleep state) or together with the processor 2221 while the main processor 2221 is in an active state (an application execution state). The auxiliary processor 2223 (the image signal processor, the communication processor, etc.) may be implemented as part of other functionally related components (the camera module 2280, the communication module 2290, etc.)

The memory 2230 may store various data required by the components of the electronic apparatus 2201 (the processor 2220, the sensor module 2276, etc.) The data may include, for example, input data and/or output data with respect to software (the program 2240, etc.) and commands related to the software. The memory 2230 may include a volatile memory 2232 and/or a nonvolatile memory 2234.

The program 2240 may be stored as software in the memory 2230 and may include an operating system 2242, middleware 2244 and/or an application 2246.

The input apparatus 2250 may receive commands and/or data to be used for components (the processor 2220, etc.) of the electronic apparatus 2201 from the outside (a user, etc.) of the electronic apparatus 2201. The input apparatus 2250 may include a microphone, a mouse, a keyboard, and/or a digital pen (a stylus pen, etc.)

The audio output apparatus 2255 may output an audio signal to the outside of the electronic apparatus 2201. The audio output apparatus 2255 may include a speaker and/or a receiver. The speaker may be used for general purposes such as multimedia playback or recording playback, and the receiver may be used to receive incoming calls. The receiver may be combined as a part of the speaker or may be implemented as an independent separate device.

The display apparatus 2260 may visually provide information to the outside of the electronic apparatus 2201. The display apparatus 2260 may include a display, a hologram device, or a projector and a control circuitry for controlling the corresponding device. The display apparatus 2260 may include a touch circuitry set to sense a touch, and/or a sensor circuitry (a pressure sensor, etc.) set to measure the intensity of a force generated by the touch.

The audio module 2270 may convert sound into an electric signal, or vice versa. The audio module 2270 may obtain sound through the input apparatus 2250 or output sound through the sound output device 2255, and/or a speaker and/or a headphone of another electronic apparatus (an electronic apparatus 2102, etc.) directly or wirelessly connected to the electronic apparatus 2201.

The sensor module 2210 may detect an operating state (power, temperature, etc.) of the electronic apparatus 2201 or an external environmental state (a user state, etc.), and generate an electrical signal and/or a data value corresponding to the detected state. The sensor module 2210 may include the fingerprint sensor 2211, an acceleration sensor 2212, a position sensor 2213, a 3D sensor 2214, etc. In addition, the sensor module 2210 may include an iris sensor, a gyro sensor, an air pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may radiate predetermined light onto an object and analyze the reflected light from the object to sense the shape and movement of the object, and may include any one of the meta-optical devices 100, 101, 102, 103, 104, 105, and 106.

The interface 2277 may support one or more specified protocols that may be used for the electronic apparatus 2201 to connect directly or wirelessly with another electronic apparatus (the electronic apparatus 2102, etc.) The interface 2277 may include a High Definition Multimedia Interface (HDMI), a Universal Serial Bus (USB) interface, an SD card interface, and/or an audio interface.

The connection terminal 2278 may include a connector through which the electronic apparatus 2201 may be physically connected to another electronic apparatus (the electronic apparatus 2102, etc.) The connection terminal 2278 may include an HDMI connector, a USB connector, an SD card connector, and/or an audio connector (a headphone connector, etc.)

The haptic module 2279 may convert an electrical signal into a mechanical stimulus (vibration, movement, etc.) or an electrical stimulus that a user may perceive through a tactile or motor sense. The haptic module 2279 may include a motor, a piezoelectric element, and/or an electrical stimulation device.

The camera module 2280 may capture a still image and a moving image. The camera module 2280 may include a lens assembly including one or more lenses, image sensors, image signal processors, and/or flashes. The lens assembly included in the camera module 2280 may collect light emitted from a subject that is a target of image capture, and such a lens assembly may include any one of the meta-optical devices 100, 101, 102, 103, 104, 105, and 106 according to the above-described example embodiments.

The power management module 2288 may manage power supplied to the electronic apparatus 2201. The power management module 2288 may be implemented as a part of a Power Management Integrated Circuit (PMIC).

The battery 2289 may supply power to components of the electronic apparatus 2201. The battery 2289 may include a non-rechargeable primary cell, a rechargeable secondary cell, and/or a fuel cell.

The communication module 2290 may establish a direct (wired) communication channel and/or a wireless communication channel between the electronic apparatus 2201 and other electronic apparatuses (the electronic apparatus 2102, the electronic apparatus 2104, the server 2108, etc.) and support performing communication through the established communication channel. The communication module 2290 may operate independently from the processor 2220 (an application processor, etc.) and may include one or more communication processors that support direct communication and/or wireless communication. The communication module 2290 may include a wireless communication module 2292 (a cellular communication module, a short-range wireless communication module, a Global Navigation Satellite System (GNSS) communication module, etc.) and/or a wired communication module 2294 (a Local Area Network (LAN) communication module, a power line communication module, etc.) Among these communication modules, a corresponding communication module may communicate with other electronic apparatuses through the first network 2298 (a short-range communication network such as Bluetooth, WiFi Direct or Infrared Data Association (IrDA) or the second network 2299 (a telecommunication network such as a cellular network, the Internet, or a computer network (LAN, WAN, etc.)) These various types of communication modules may be integrated into one component (a single chip, etc.), or may be implemented as a plurality of separate components (multiple chips). The wireless communication module 2292 may use subscriber information (International Mobile Subscriber Identifier (IMSI), etc.) stored in the subscriber identification module 2296 to identify and authenticate the electronic apparatus 2201 within a communication network such as the first network 2298 and/or the second network 2299.

The antenna module 2297 may transmit or receive signals and/or power to or from the outside (other electronic apparatuses, etc.) The antenna may include a radiator in a conductive pattern formed on a substrate (a PCB, etc.) The antenna module 2297 may include one or a plurality of antennas. When the antenna module 2297 includes a plurality of antennas, the communication module 2290 may select an antenna suitable for a communication method used in the communication network such as the first network 2298 and/or the second network 2299 from among the plurality of antennas. Signals and/or power may be transmitted or received between the communication module 2290 and another electronic apparatus through the selected antenna. In addition to the antenna, other components (RFIC, etc.) may be included as part of the antenna module 2297.

Some of the components may be connected to each other through a communication method (a bus, General Purpose Input and Output (GPIO), Serial Peripheral Interface (SPI), Mobile Industry Processor Interface (MIPI), etc.) between peripheral devices and interchange and signals (commands, data, etc.).

The commands or the data may be transmitted or received between the electronic apparatus 2201 and the external electronic apparatus 2204 through the server 2108 connected to the second network 2299. The other electronic apparatuses 2202 and 2204 may be the same type as or different types from the electronic apparatus 2201. All or some of the operations executed by the electronic apparatus 2201 may be executed by one or more of the other electronic apparatuses 2202, 2204, and 2208. For example, when the electronic apparatus 2201 needs to perform a function or service, instead of executing the function or service by itself, the electronic apparatus 2201 may request one or more other electronic apparatuses to perform part or entirety of the function or the service. One or more other electronic apparatuses that have received the request may execute an additional function or service related to the request, and transmit a result of execution to the electronic apparatus 2201. To this end, cloud computing, distributed computing, and/or client-server computing technology may be used.

Figure 22:
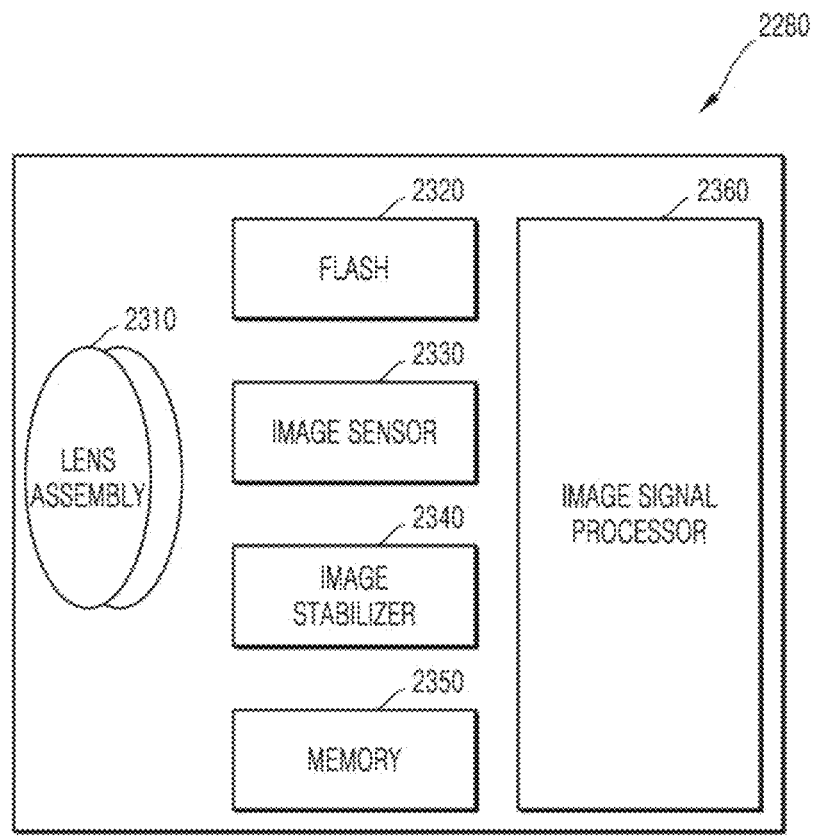
FIG. 22 is a block diagram illustrating a schematic configuration of a camera module included in the electronic apparatus of FIG. 21.

FIG. 22 is a block diagram illustrating a schematic configuration of the camera module 2208 included in the electronic apparatus 2201 of FIG. 21.

Figure 23:
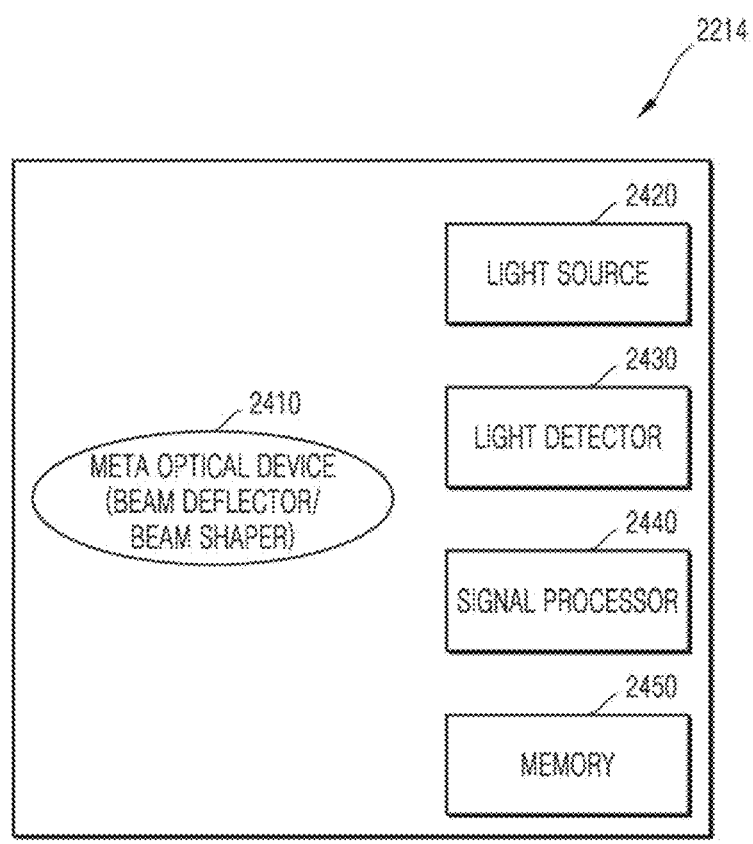
FIG. 23 is a block diagram illustrating a schematic configuration of a three-dimensional (3D) sensor included in the electronic apparatus of FIG. 21.

Referring to FIG. 23, the camera module 2280 may include a lens assembly 2310, a flash 2320, an image sensor 2330, an image stabilizer 2340, a memory 2350 (a buffer memory, etc.), and/or an image signal processor 2360. The lens assembly 2310 may collect light emitted from a subject that is a target of image capture, and may include any one of the above-described meta-optical devices 100, 101, 102, 103, 104, 105, and 106. The lens assembly 2310 may include one or more refractive lenses and a meta-optical device. The meta-optical device provided therein may be designed as a lens having a target phase delay profile representing a dispersion suitable for a predetermined aberration correction and a predetermined refractive index. The lens assembly 2310 including such a meta-optical device may implement desired optical performance and may have a short optical length.

The camera module 2280 may further include an actuator. The actuator may drive positions of lens elements constituting the lens assembly 2310 for zooming and/or autofocus (AF), and adjust a separation distance between the lens elements.

The camera module 2280 may include a plurality of lens assemblies 2310, and in this case, the camera module 2280 may be a dual camera, a 360 degree camera, or a spherical camera. Some of the plurality of lens assemblies 2310 may have the same lens property (an angle of view, a focal length, AF, a F number, optical zoom, etc.), or may have different lens properties. The lens assembly 2310 may include a wide-angle lens or a telephoto lens.

The flash 2320 may emit light used to enhance light emitted or reflected from a subject. The flash 2320 may include one or more light emitting diodes (Red-Green-Blue (RGB) LED, White LED, Infrared LED, Ultraviolet LED, etc.), and/or a Xenon Lamp. The image sensor 2330 may be the image sensor 1200 described in FIGS. 1, 5 and 7, and may obtain an image corresponding to the subject by converting the light emitted or reflected from the subject and transmitted through the lens assembly 2310 into an electrical signal. The image sensor 2330 may include one or a plurality of sensors selected from image sensors having different attributes, such as an RGB sensor, a black and white (BW) sensor, an IR sensor, or a UV sensor. Each of the sensors included in the image sensor 2330 may be implemented as a Charged Coupled Device (CCD) sensor and/or a Complementary Metal Oxide Semiconductor (CMOS) sensor.

The image stabilizer 2340 may move one or more lenses included in the lens assembly 2310 or image sensors 2330 in a specific direction in response to the movement of the camera module 2280 or the electronic apparatus 2301 including the camera module 2280 or control the operating characteristics of the image sensor 2330 (adjusting read-out timing, etc.) to compensate for a negative influence due to the movement. The image stabilizer 2340 may use a gyro sensor or an acceleration sensor disposed inside or outside the camera module 2280 to detect the movement of the camera module 2280 or the electronic apparatus 2301. The image stabilizer 2340 may be implemented optically.

The memory 2350 may store part or entire data of an image obtained through the image sensor 2330 for a next image processing operation. For example, when a plurality of images are obtained at high speed, obtained original data (Bayer-Patterned data, high-resolution data, etc.) may be stored in the memory 2350, only low-resolution images may be displayed, and then the original data of a selected (a user selection, etc.) image may be transmitted to the image signal processor 2360. The memory 2350 may be integrated into the memory 2230 of the electronic apparatus 2201, or may be configured as a separate memory that operates independently.

The image signal processor 2360 may perform one or more image processing operations on the image obtained through the image sensor 2330 or the image data stored in the memory 2350. One or more image processing may include depth map generation, 3D modeling, panorama generation, feature point extraction, image synthesis, and/or image compensation (noise reduction, resolution adjustment, brightness adjustment, blurring, sharpening, softening, etc.) The image signal processor 2360 may perform control (exposure time control, read-out timing control, etc.) of components (the image sensor 2330, etc.) included in the camera module 2280. The image processed by the image signal processor 2360 may be stored again in the memory 2350 for further processing or may be provided to external components (the memory 2230, the display apparatus 2260, the electronic apparatus 2202, the electronic apparatus 2204, the server 2208, etc.) of the camera module 2280. The image signal processor 2360 may be integrated into the processor 2220 or may be configured as a separate processor that operates independently from the processor 2220. When the image signal processor 2360 is configured as the processor separate from the processor 2220, the image processed by the image signal processor 2360 may undergo additional image processing by the processor 2220 and then be displayed through the display apparatus 2260.

The electronic apparatus 2201 may include the plurality of camera modules 2280 having different properties or functions. In this case, one of the plurality of camera modules 2280 may be a wide-angle camera, and the other may be a telephoto camera. Similarly, one of the plurality of camera modules 2280 may be a front camera and the other may be a rear camera.

FIG. 23 is a block diagram illustrating a schematic configuration of the 3D sensor 2214 included in the electronic apparatus 2201 of FIG. 21.

The 3D sensor 2214 irradiates predetermined light onto an object, receives and analyzes the light reflected from the object, and senses the shape and movement of the object. The 3D sensor 2214 includes a light source 2420, a meta optical device 2410, a light detector 2430, a signal processor 2440, and a memory 2450. As the meta-optical device 2410, any one of the meta-optical devices 100, 101, 102, 103, 104, 105, and 106 according to the above-described example embodiments may be employed, and a target phase delay profile may be set to function as a beam deflector or a beam shaper.

The light source 2420 radiates the light to be used for analyzing the shape or the position of the object. The light source 2420 may include a light source that generates and irradiates light of a small wavelength. The light source 2420 may include a light source such as a laser diode (LD), a light emitting diode (LED), a super luminescent diode (SLD), etc. that generate and radiate light in a wavelength band suitable for analysis of the position and the shape of the object, for example, light in an infrared band wavelength. The light source 2420 may be a tunable laser diode. The light source 2420 may generate and irradiate light of a plurality of different wavelength bands. The light source 2420 may generate and irradiate pulsed light or continuous light.

The meta-optical device 2410 modulates the light radiated from the light source 1100 and transmits the light to the object. When the meta-optical device 2410 is a beam deflector, the meta-optical device 2410 may deflect incident light in a predetermined direction to direct the incident light toward the object. When the meta-optical device 2410 is a beam shaper, the meta-optical device 2410 modulates the incident light such that the incident light has a distribution having a predetermined pattern. The meta-optical device 2410 may form structured light suitable for 3D shape analysis.

As described above, the meta-optical device 2410 may set the phase delay dispersion ($\partial\varphi/\partial\lambda$) to 0, a positive number, or a negative number, and implement a continuous phase delay profile. Therefore, the meta-optical device 2410 may perform achromatic optical modulation according to the wavelength. The meta-optical device 2410 may enhance the deviation according to the wavelength such that the deflection direction may be different for each wavelength or a different beam pattern may be formed for each wavelength to radiate the light to the object.

The light detector 2430 receives reflected light of the light radiated to the object through the meta-optical device 2410. The light detector 2430 may include an array of a plurality of sensors that sense light, or may include only one sensor.

The signal processor 2440 may analyze the shape of the object by processing a signal sensed by the light detector 2430. The signal processor 2440 may analyze a 3D shape including a depth position of the object.

For 3D shape analysis, an operation for measuring light time of flight may be performed. Various calculation methods may be used to measure the light time of flight. For example, a direct time measurement method obtains a distance by projecting pulsed light onto an object and measuring the time when the light is reflected from the object and returns by using a timer. A correlation method projects pulsed light onto an object and measures a distance from the brightness of reflected light reflected from the object and returned. A phase delay measurement method is a method of projecting a continuous wave light such as a sine wave onto an object, detecting a phase difference of reflected light reflected and returned, and converting the phase difference into a distance.

When the structured light is radiated on the object, the depth position of the object may be calculated from a pattern change of the structured light reflected from the object, that is, a result of comparison with an incident structured light pattern. The depth information of the object may be extracted by tracking a pattern change of the structured light reflected from the object for each coordinate, and 3D information related to the shape and motion of the object may be extracted from the depth information.

The memory 2450 may store programs and other data necessary for the operation of the signal processor 2440.

The operation result of the signal processor 2440, that is, information about the shape and position of the object may be transmitted to another unit in the electronic apparatus 2200 or to another electronic apparatus. For example, the information may be used in the application 2246 stored in the memory 2230. Other electronic apparatus to which the result is transmitted may be a display apparatus or a printer that outputs the result. In addition, the other electronic apparatus may include a self-driving device such as unmanned vehicles, autonomous vehicles, robots, drones, etc., smart phones, smart watches, mobile phones, personal digital assistants (PDAs), laptops, PCs, and various wearable devices, other mobile or non-mobile computing devices, and Internet of Things devices, but is not limited thereto.

The above-described meta-optical device may utilize nanostructures arranged in a multi-layered structure and control a refractive index change and a dispersion change of each layer to implement a phase delay profile with little discontinuity.

The above-described meta-optical device may exhibit high diffraction efficiency with respect to light in a wide wavelength band.

The above-described meta-optical device may be used as a lens, a beam deflector, a beam shaper, and the like, and may be employed in various electronic apparatuses utilizing the lens, the beam deflector, and the beam shaper.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A meta-optical device comprising:
   a first layer comprising a plurality of first nanostructures spaced apart from each other in a horizontal direction and a first material disposed adjacent to each first nanostructure of the plurality of first nanostructures;
   a second layer disposed on the first layer in a vertical direction, the second layer comprising a plurality of second nanostructures spaced apart from each other in the horizontal direction and a second material disposed adjacent to each second nanostructure of the plurality of second nanostructures,
   wherein the first layer and the second layer comprise regions in which signs of an effective refractive index change rate in a first direction are opposite to each other, and
   wherein the meta-optical device is configured to obtain a target phase delay profile with respect to incident light of a predetermined wavelength band.

2. The meta-optical device of claim 1, wherein a first ratio of a dispersion change rate to an effective refractive index change rate in the first direction of the first layer is different from a second ratio of a dispersion change rate to an effective refractive index change rate in the first direction of the second layer.

3. The meta-optical device of claim 1, wherein the target phase delay profile has a dispersion that is 0 with respect to a wavelength of the predetermined wavelength band.

4. The meta-optical device of claim 1, wherein a phase delay profile of the first layer and the target phase delay profile have a same sign of a change rate in the first direction.

5. The meta-optical device of claim 4, wherein a second ratio of a dispersion change rate to an effective refractive index change rate of the second layer in the first direction is greater than a first ratio of a dispersion change rate to an effective refractive index change rate of the first layer in the first direction.

6. The meta-optical device of claim 5, wherein a material included in the second layer has a greater dispersion than a material included in the first layer.

7. The meta-optical device of claim 1, wherein a first phase delay profile of the first layer and a second phase delay profile of the second layer have opposite signs of a change rate corresponding to a position change in the first direction.

8. The meta-optical device of claim 1, wherein the target phase delay profile is a continuous function with respect to a position of the meta-optical device in the predetermined wavelength band.

9. The meta-optical device of claim 1, wherein the plurality of first nanostructures and the plurality of second nanostructures have a pillar shape.

10. The meta-optical device of claim 9, wherein the plurality of first nanostructures and the plurality of second nanostructures have a ratio of height to width greater than 2.

11. The meta-optical device of claim 9, wherein a first height of the plurality of first nanostructures and a second height of the plurality of second nanostructures are greater than a center wavelength of the predetermined wavelength band.

12. The meta-optical device of claim 9, wherein the plurality of first nanostructures have a higher refractive index than the first material,
   wherein the plurality of second nanostructures have a higher refractive index than the second material, and
   wherein a pattern of change in widths of the plurality of first nanostructures and a pattern of change in widths of the plurality of second nanostructures are opposite to each other along a direction away from a center of the meta-optical device.

13. The meta-optical device of claim 9, wherein the plurality of first nanostructures have a lower refractive index than the first material,
   wherein the plurality of second nanostructures have a higher refractive index than the second material, and
   wherein a pattern of change in widths of the plurality of first nanostructures and a pattern of change in widths of the plurality of second nanostructures are same along a direction away from a center of the meta-optical device.

14. The meta-optical device of claim 9, wherein the plurality of first nanostructures have an inner pillar and a shell pillar disposed adjacent to the inner pillar.

15. The meta-optical device of claim 14, wherein a refractive index of the inner pillar is lower than a refractive index of the shell pillar.

16. The meta-optical device of claim 15, wherein the refractive index of the shell pillar is higher than a refractive index of the first material.

17. The meta-optical device of claim 16, wherein the plurality of second nanostructures have a higher refractive index than the second material.

18. The meta-optical device of claim 17, wherein a pattern of change in widths of the plurality of first nanostructures and a pattern of change in widths of the plurality of second nanostructures are opposite to each other along a direction away from a center of the meta-optical device.

19. The meta-optical device of claim 16, wherein the plurality of second nanostructures have a lower refractive index than the second material.

20. The meta-optical device of claim 19, wherein a pattern of change in widths of the plurality of first nanostructures and a pattern of change in widths of the plurality of second nanostructures are same as each other along a direction away from a center of the meta-optical device.

21. The meta-optical device of claim 9, wherein the plurality of first nanostructures are a plurality of holes.

22. The meta-optical device of claim 21, wherein the plurality of second nanostructures have a higher refractive index than the second material.

23. The meta-optical device of claim 22, wherein a pattern of change in widths of the plurality of holes of the plurality of first nanostructures and a pattern of change in widths of a plurality of holes of the plurality of second nanostructures are same as each other along a direction away from a center of the meta-optical device.

24. The meta-optical device of claim 21, wherein the plurality of second nanostructures have a lower refractive index than the second material.

25. The meta-optical device of claim 24, wherein a pattern of change in widths of the plurality of holes of the plurality of first nanostructures and a pattern of change in widths of a plurality of holes of the plurality of second nanostructures are opposite to each other along a direction away from a center of the meta-optical device.

26. The meta-optical device of claim 1, further comprising:
a support layer configured to support the first layer and the second layer.

27. The meta-optical device of claim 1, further comprising:
a spacer layer between the first layer and the second layer.

28. The meta-optical device of claim 1, wherein the target phase delay profile has a dispersion less than 0 with respect to a wavelength of light in the predetermined wavelength band.

29. The meta-optical device of claim 1, wherein the target phase delay profile has a dispersion greater than 0 with respect to a wavelength of light in the predetermined wavelength band.

30. The meta-optical device of claim 1, wherein the meta-optical device is a lens.

31. The meta-optical device of claim 1, wherein the meta-optical device is a beam deflector.

32. The meta-optical device of claim 1, wherein the meta-optical device is a beam shaper.

33. The meta-optical device of claim 1, wherein the predetermined wavelength band is in a range of 400 nm to 700 m.

34. The meta-optical device of claim 1, wherein a ratio of a length of a region in the first direction to a total length of the meta-optical device in the first direction is greater than or equal to 80%.

35. The meta-optical device of claim 1, wherein a diffraction efficiency of the meta-optical device is greater than or equal to 0.8 with respect to light in the predetermined wavelength band.

36. An electronic apparatus comprising:
an imaging lens assembly comprising at least one refractive lens and a meta-optical device, the meta-optical device comprising:
a first layer comprising a plurality of first nanostructures spaced apart from each other in a horizontal and a first material disposed adjacent to each first nanostructure of the plurality of first nanostructures;
a second layer disposed on the first layer in a vertical direction, the second layer comprising a plurality of second nanostructures spaced apart from each other in the horizontal and a second material disposed adjacent to each second nanostructure of the plurality of second nanostructures,
wherein the first layer and the second layer comprise regions in which signs of an effective refractive index change rate in a first direction are opposite to each other, and
wherein the meta-optical device is configured to obtain a target phase delay profile with respect to incident light of a predetermined wavelength band; and
an image sensor configured to convert an optical image formed by the imaging lens assembly into an electrical signal.

37. An electronic apparatus comprising:
a light source;
a meta-optical device configured to modulate light from the light source and transfer the light to an object, the meta-optical device comprising:
a first layer comprising a plurality of first nanostructures spaced apart from each other in a horizontal direction and a first material disposed adjacent to each first nanostructure of the plurality of first nanostructures;
a second layer disposed on the first layer in a vertical direction, the second layer comprising a plurality of second nanostructures spaced apart from each other in the horizontal direction and a second material disposed adjacent to each second nanostructure of the plurality of second nanostructures,
wherein the first layer and the second layer comprise regions in which signs of an effective refractive index change rate in a first direction are opposite to each other, and
wherein the meta-optical device is configured to obtain a target phase delay profile with respect to incident light of a predetermined wavelength band; and
a light detector configured to sense light reflected from the object that is irradiated with the modulated light from the meta-optical device.

38. A meta-optical device comprising:
a first layer comprising a plurality of first nanostructures spaced apart from each other in a horizontal direction and a first material disposed adjacent to each first nanostructure of the plurality of first nanostructures;

a second layer disposed on the first layer in a vertical direction, the second layer comprising a plurality of second nanostructures spaced apart from each other in the horizontal direction and a second material disposed adjacent to each second nanostructure of the plurality of second nanostructures, wherein the first layer and the second layer comprise regions in which signs of an effective refractive index change rate in the horizontal direction are opposite to each other, and wherein a pattern of change in widths of the plurality of first nanostructures and a pattern of change in widths of the plurality of second nanostructures are equal to or opposite from each other in a direction away from a center of the meta-optical device.

* * * * *